US012529986B2

(12) United States Patent
Yoshioka et al.

(10) Patent No.: US 12,529,986 B2
(45) Date of Patent: Jan. 20, 2026

(54) FIXING UNIT AND IMAGE FORMING APPARATUS

(71) Applicant: CANON KABUSHIKI KAISHA, Tokyo (JP)

(72) Inventors: Mahito Yoshioka, Shizuoka (JP); Takanori Yamamoto, Shizuoka (JP); Hirohiko Aiba, Shizuoka (JP); Keisuke Mochizuki, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/790,111

(22) Filed: Jul. 31, 2024

(65) Prior Publication Data

US 2025/0053124 A1 Feb. 13, 2025

(30) Foreign Application Priority Data

Aug. 9, 2023 (JP) ................................ 2023-130536

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
None
See application file for complete search history.

(56) References Cited

U.S. PATENT DOCUMENTS

2001/0032835 A1* 10/2001 Murooka ............. H05B 3/0095 219/388
2018/0181037 A1* 6/2018 Kataoka ............. G03G 15/2053
2023/0288852 A1* 9/2023 Ishigaya ............ G03G 15/2053
2024/0036501 A1* 2/2024 Tanaka .............. G03G 15/2042

FOREIGN PATENT DOCUMENTS

JP 2017049618 A 3/2017
JP 2022102905 A 7/2022

* cited by examiner

*Primary Examiner* — Sevan A Aydin
(74) *Attorney, Agent, or Firm* — ROSSI, KIMMS & McDOWELL LLP

(57) ABSTRACT

A fixing unit includes a rotary member, a pressure member configured to form a fixing nip, a heater disposed in an internal space of the rotary member, the heater including a substrate, and a heating element provided on the substrate and configured to heat the rotary member by being energized, a heater holder configured to hold the heater, and a heat conducting member disposed between the heater and the heater holder. The fixing nip conveys the sheet in a direction parallel to a short direction perpendicular to a longitudinal direction of the heater. The heater includes a protrusion extending toward the heater holder from a surface, of the heater, provided on a side opposite to the fixing nip. The protrusion faces the heat conducting member in the longitudinal direction and is disposed so as not to overlap the heat conducting member as viewed in the short direction.

25 Claims, 30 Drawing Sheets

FIXING UNIT AND IMAGE FORMING APPARATUS

BACKGROUND OF THE INVENTION

Field of the Invention

The present invention relates to a fixing unit that fixes a toner image on a sheet and an image forming apparatus including the same.

Description of the Related Art

JP 2017-049618 A proposes a fixing unit that fixes a toner image onto a sheet, the fixing unit including a cylindrical film, a heater contacting the film, a support member supporting the heater, and a pressure roller forming a nip portion together with the heater via the film. A heat conducting member having high heat conductivity is attached to a surface of the heater opposite to the surface contacting the film, and the heat conducting member levels out the temperature of the heater in the longitudinal direction. The heat conducting member repeatedly expands and contracts as the temperature of the heater changes, which causes a positional deviation of the heat conducting member in the longitudinal direction with respect to the heater. JP 2017-049618 A proposes a configuration in which the heat conducting member is locked by the support member by providing a bent portion in the heat conducting member and inserting an outer portion of the bent portion into a hole of the support member.

Further, JP 2022-102905 A proposes a fixing unit including a heater having a protrusion on a back surface thereof and a heat conducting member having a groove to be fitted to the protrusion. The protrusion of the heater and the groove of the heat conducting member are fitted to each other to restrict a movement of the heat conducting member in the longitudinal direction with respect to the heater.

In JP 2017-049618 A and JP 2022-102905 A, a positional deviation of the heat conducting member is suppressed by fitting the bent portion or the groove of the heat conducting member to the support member or the heater. However, when the temperature of the bent portion or the groove of the heat conducting member becomes high, excessive thermal expansion may occur in the bent portion and the groove in the fitted state, and the heat conducting member may be deformed. In addition, if the heat conducting member is subjected to bending processing or punching processing, the heat conducting member may be deformed or damaged when the heat conducting member thermally expands due to residual stress resulting from the processing.

SUMMARY OF THE INVENTION

According to one aspect of the present invention, a fixing unit includes a rotary member having a cylindrical shape, a pressure member configured to form a fixing nip that fixes a toner image onto a sheet together with the rotary member, a heater disposed in an internal space of the rotary member, the heater including a substrate, and a heating element provided on the substrate and configured to heat the rotary member by being energized, a heater holder configured to hold the heater, and a heat conducting member disposed between the heater and the heater holder. The fixing nip conveys the sheet in a direction parallel to a short direction perpendicular to a longitudinal direction of the heater. The heater includes a protrusion extending toward the heater holder from a surface, of the heater, provided on a side opposite to the fixing nip. The protrusion faces the heat conducting member in the longitudinal direction and is disposed so as not to overlap the heat conducting member as viewed in the short direction.

Further features of the present invention will become apparent from the following description of exemplary embodiments with reference to the attached drawings.

DESCRIPTION OF THE EMBODIMENTS

First Embodiment

Overall Configuration of Image Forming Apparatus

Figure 1:
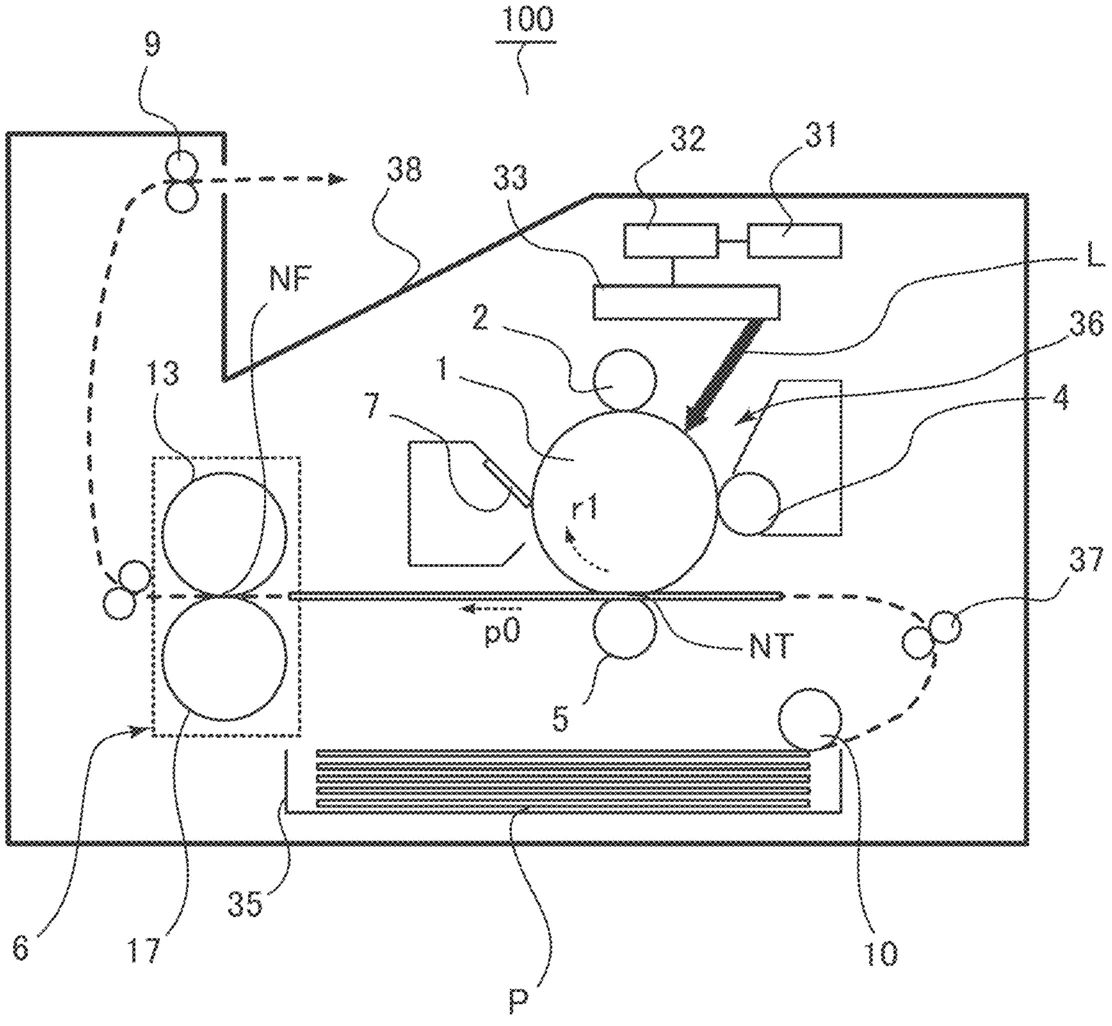
FIG. 1 is a schematic diagram illustrating an image forming apparatus according to a first embodiment.

First, a first embodiment of the present invention will be described. FIG. 1 is a schematic diagram illustrating an image forming apparatus 100. The image forming apparatus 100 according to the first embodiment is an electrophotographic laser beam printer. As illustrated in FIG. 1, the image forming apparatus 100 includes a feed cassette 35 provided to be insertable into and removable from a main body of the image forming apparatus 100, and a feed roller 10. The image forming apparatus 100 includes an image forming unit 36 that forms an image (a toner image) on a sheet P fed by the feed roller 10, a fixing unit 6, and a sheet discharge roller pair 9. In the present embodiment, the sheet as a recording material includes a sheet such as paper or an envelope, a plastic film such as a sheet for an overhead projector (OHP), cloth, or the like.

When an image formation command is output to the image forming apparatus 100, an image formation process is started by the image forming unit 36 based on image information input from an external computer connected to the image forming apparatus 100, an image reading device connected as an option, or the like. The image forming unit 36 includes a process cartridge including a photosensitive drum 1, a charging roller 2, a developing roller 4, a cleaning blade 7, etc., a laser scanner 33, and a transfer roller 5. The photosensitive drum 1 is rotated in a direction indicated by an arrow r1 by a driving force transmitted from a driving motor (not illustrated).

The image forming apparatus 100 is provided with a video controller 31 that converts image information input from an external personal computer or the like into image creation information. The laser scanner 33 receives a light emission instruction from a control unit 32 based on the image creation information received from the video controller 31, and irradiates the photosensitive drum 1 with laser light L. At this time, the photosensitive drum 1 is charged in advance by the charging roller 2, and an electrostatic latent image is formed on the photosensitive drum 1 when irradiated with the laser light L. Thereafter, the electrostatic latent image is developed by the developing roller 4 to form a toner image on the photosensitive drum 1.

In parallel with the above-described image formation process, sheets P stacked on the feed cassette 35 are sent out by the feed roller 10. The sheets P fed by the feed roller 10 are conveyed by a conveyance roller pair 37 toward a transfer nip NT formed by the photosensitive drum 1 and the transfer roller 5. By applying a transfer bias to the transfer roller 5, the toner image formed on the photosensitive drum 1 is transferred to the sheet P at the transfer nip NT. The toner remaining on the photosensitive drum 1 is collected by the cleaning blade 7.

The sheet P to which the toner image has been transferred by the transfer nip NT is heated and pressurized by a fixing nip NF of the fixing unit 6 to fix the toner image. Then, the sheet Ponto which the toner image is fixed is discharged to a sheet discharge tray 38 by the sheet discharge roller pair 9.

Configuration of Fixing Unit

Figure 2:
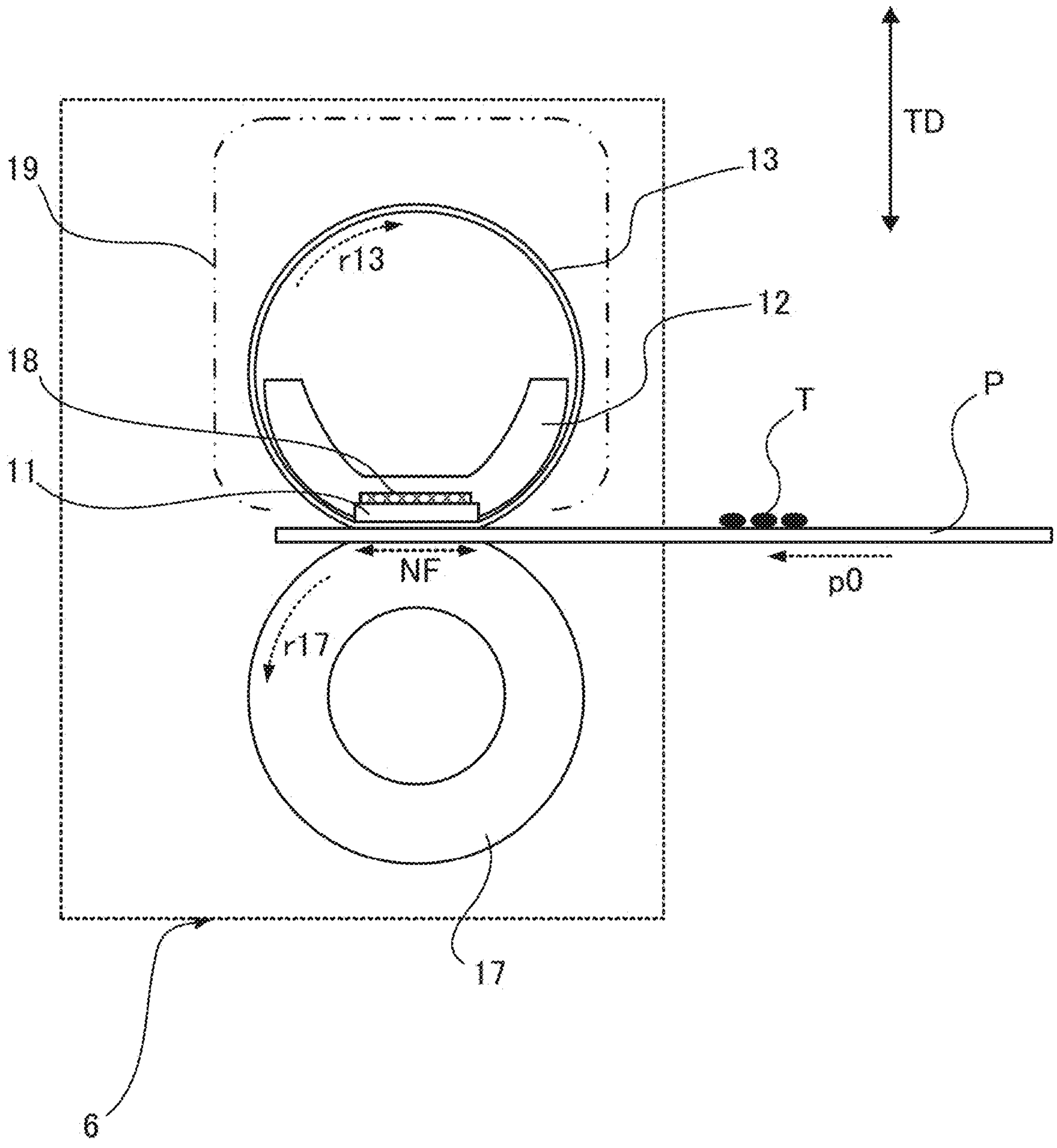
FIG. 2 is a cross-sectional view illustrating a fixing unit.

Next, a configuration of the fixing unit 6 will be described with reference to FIG. 2. FIG. 2 is a cross-sectional view illustrating the fixing unit 6. As illustrated in FIG. 2, the fixing unit 6 includes a fixing film unit 19, a pressure roller 17, etc. The fixing film unit 19 is pressed toward the pressure roller 17 by a pressure unit (not illustrated) to form the fixing nip NF together with the pressure roller 17. Note that the pressure roller 17 may be pressed toward the fixing film unit 19. The sheet P holding an unfixed toner image T on an upper surface thereof is introduced into the fixing nip NF by conveyance in a sheet conveyance direction p0, and is heated and pressurized at the fixing nip NF to fix the unfixed toner image.

The fixing film unit 19 includes a fixing film 13 having flexibility and formed in a cylindrical shape, and a heater 11 contacting an inner surface of the fixing film 13 to heat the fixing film 13. Further, the fixing film unit 19 includes a heater holder 12 holding the heater 11, and a heat conducting member 18 disposed between the heater 11 and the heater holder 12. The fixing film 13 serving as a rotary member and a film is rotatable in a direction indicated by an arrow r13 while being in contact with the sheet P conveyed in the sheet conveyance direction p0. Note that, instead of the fixing film 13, an endless belt having flexibility or the like may be used. The heater 11 nips the fixing film 13 together with the pressure roller 17.

The pressure roller 17 serving as a pressure member has a metal core and a rubber layer, and abuts on an outer circumferential surface of the fixing film 13. It can also be said that the pressure roller 17 forms the fixing nip NF that nips the sheet P during conveyance together with the heater 11 via the fixing film 13. The pressure roller 17 is driven to rotate in a direction indicated by an arrow r17 by a motor (not illustrated) via a gear. When the pressure roller 17 rotates, the fixing film 13 rotates following the rotation of the pressure roller 17.

Figure 3:
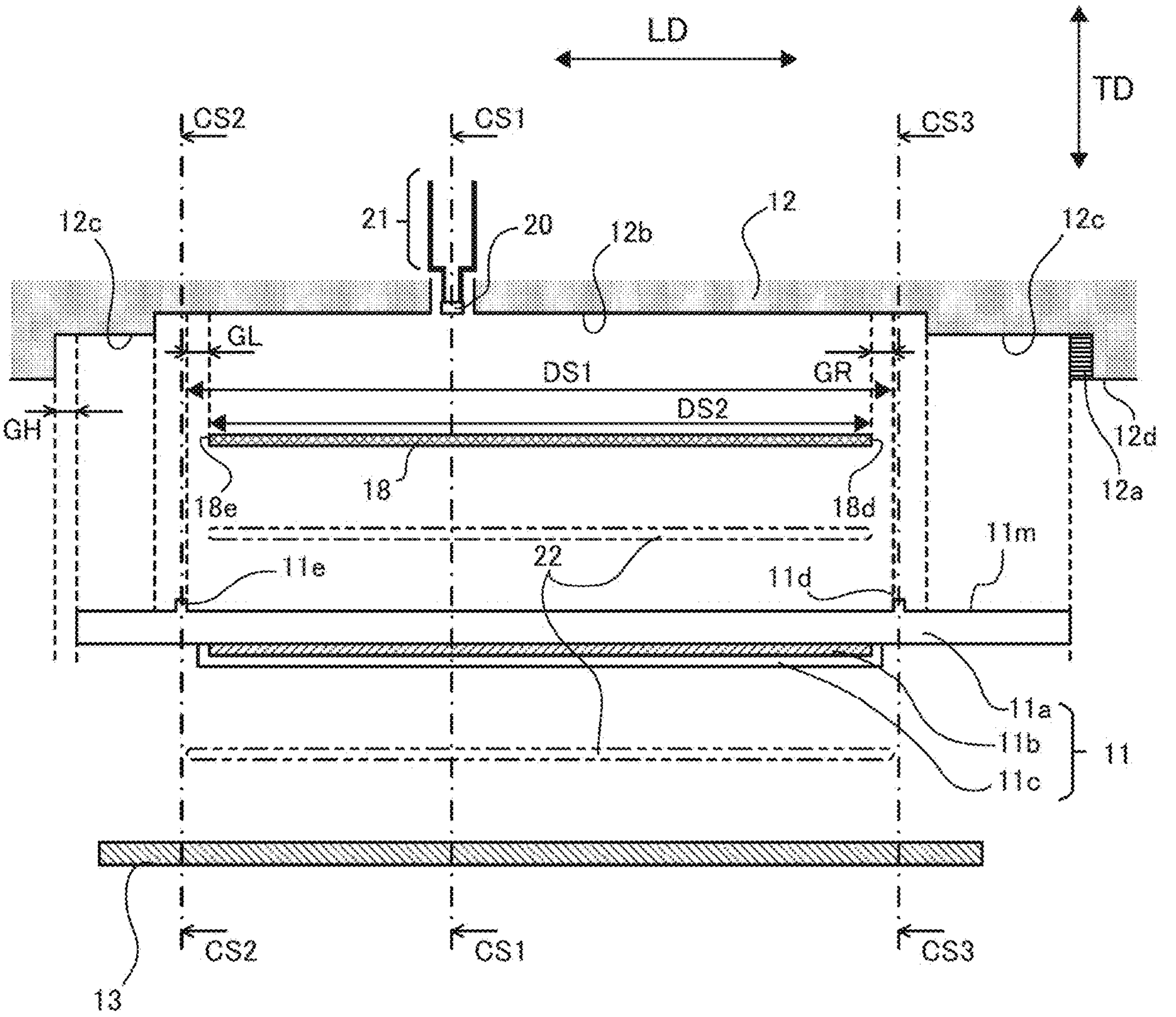
FIG. 3 is a cross-sectional view illustrating a cross section parallel to a longitudinal direction of a peripheral configuration of a heater.

Each member constituting the fixing unit 6 extends in a direction perpendicular to the sheet conveyance direction p0 and a thickness direction TD of the sheet P, that is, a direction from the front to the back in FIG. 2 as a longitudinal direction LD (see FIG. 3). The dimension in the longitudinal direction LD of each member constituting the fixing unit 6 is set to correspond to a size of a sheet P allowed to pass through the fixing unit 6, and is set to a length corresponding to even the longitudinal feeding of LTR size sheets (215.9 mm×279.4 mm) in the fixing unit 6 according to the present embodiment. The dimension of each member in the longitudinal direction LD will be described in detail below. In addition, a direction perpendicular to the longitudinal direction LD and the thickness direction TD is defined as a short direction SD (see FIG. 4A), and the short direction SD is a direction parallel to the sheet conveyance direction p0 of the sheet P at the fixing nip NF.

Peripheral Configuration of Heater

Figure 4A:
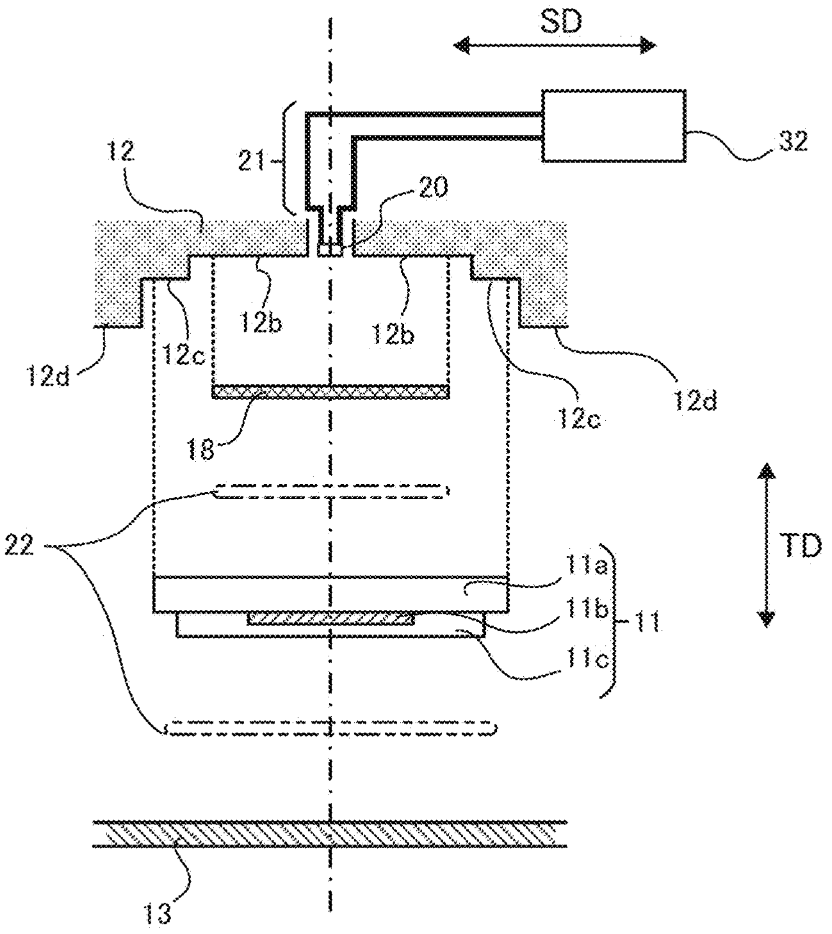
FIG. 4A is a cross-sectional view illustrating a cross section taken along line CS1-CS1 illustrated in FIG. 3.
Figure 4B:
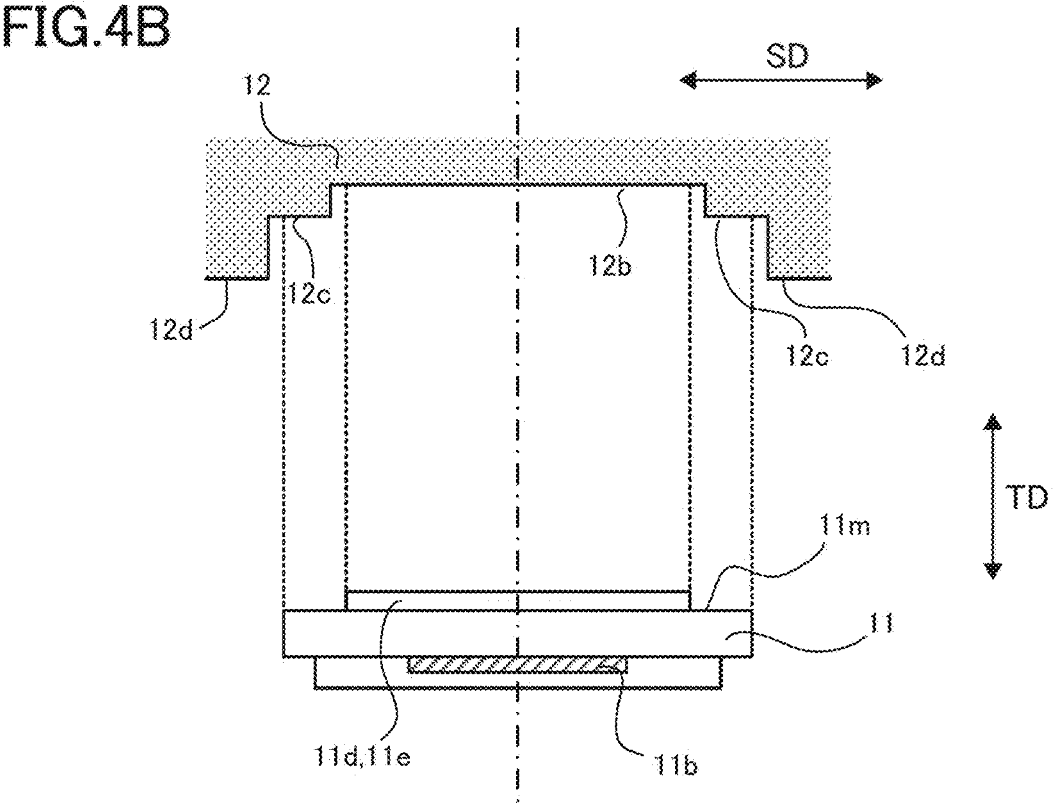
FIG. 4B is a cross-sectional view illustrating a cross section taken along line CS2-CS2 or line CS3-CS3 illustrated in FIG. 3.

Next, a detailed peripheral configuration of the heater 11 will be described. FIG. 3 is a cross-sectional view illustrating a cross section parallel to the longitudinal direction of a peripheral configuration of the heater 11. FIG. 4A is a cross-sectional view illustrating a cross section taken along line CS1-CS1 illustrated in FIG. 3. FIG. 4B is a cross-sectional view for explaining protrusions 11*d* and 11*e* to be described below, and is a cross-sectional view illustrating a CS2-CS2 cross section or a cross section taken along line CS3-CS3 illustrated in FIG. 3. Note that, in each of the drawings, an upper side of a figure in the drawing is described as a back surface of a member, and a lower side of a figure in the drawing is described as a front surface of a member. In addition, for convenience of explanation, it is illustrated in the drawings that each member is developed, but the members from the heater holder 12 to the fixing film 13 are formed to tightly adhere to each other in the actual fixing unit 6 as illustrated in FIG. 2.

As illustrated in FIG. 3, the heater 11 includes a substrate 11*a*, a resistive heating element 11*b* serving as a heating element, and a protective layer 11*c*, and is disposed in an internal space of the fixing film 13. The substrate 11*a* is made of a highly insulating ceramic substrate such as alumina (aluminum oxide) or AlN (aluminum nitride), or a heat-resistant resin substrate such as polyimide. The resistive heating element 11*b* is obtained by printing a heat generating paste layer of Ag/Pd (silver palladium), $RuO_2$ (ruthenium dioxide), $Ta_2N$ (tantalum nitride), or the like in a certain shape. The protective layer 11*c* is made of a highly insulating member such as glass or polyimide, and covers the resistive heating element 11*b* for protecting and insulating the resistive heating element 11*b*. The heater 11 according to the present embodiment is formed by stacking the resistive heating element 11*b* of Ag/Pd and the protective layer 11*c* of glass on the substrate 11*a* of alumina ceramic. The resistive heating element 11*b* is energized with an AC current by a power feeding unit (not illustrated) to generate heat.

Note that the dimensions of the substrate 11*a* are 270 mm in the longitudinal direction, 10 mm in the short direction, and 1.0 mm in the thickness direction. The dimension of the resistive heating element 11*b* is 218 mm in the longitudinal direction. In addition, the thickness (the dimension in the thickness direction) of the protective layer 11*c* including the resistive heating element 11*b* is about 60 μm, which is much smaller than the thickness of the substrate 11*a*.

A front surface of the heater 11 is in contact with a back surface of the fixing film 13 via heat resistant grease 22 serving as a lubricant, and the heater 11 heats the fixing film 13. The heat resistant grease 22 is intended to reduce friction between the front surface of the heater 11 that is fixedly supported and the back surface of the fixing film 13 that rotationally moves, and reduce friction between a front surface of the heat conducting member 18 and a back surface of the heater 11, and is obtained by dispersing a fluororesin in a fluorine-based oil.

The back surface of the heater 11 is in contact with the heat conducting member 18 via the heat resistant grease 22. The heat conducting member 18 is formed of a metal plate made of a metal material, and is formed using a flat-plate aluminum material (JIS standard: A5052) having a thickness of 0.3 mm in the present embodiment. The thermal conductivity of the heat conducting member 18 is 140 W/m·K, which is larger than the thermal conductivity, 20 W/m·K, of the substrate 11*a* of the heater 11. Since the heat conducting member 18 having a high thermal conductivity is in contact with the back surface of the heater 11, a temperature difference generated in the longitudinal direction LD of the heater 11 can be leveled out.

In addition, the thermal expansion coefficient of the heat conducting member 18 is $24\times10^{6}$ [1/K], the thermal expansion coefficient of the substrate 11*a* of the heater 11 is $7.6\times10^{6}$ [1/K], and the difference therebetween is large. Meanwhile, the heat conducting member 18 and the heater 11 are held in close contact with each other. Therefore, there is a possibility that the back surface of the heater 11 may hinder a dimensional change resulting from the thermal expansion of the heat conducting member 18 due to a frictional force, and as a result, the heat conducting member 18 may be deformed or damaged. In order to avoid such a problem, the heat resistant grease 22 is applied between the back surface of the heater 11 and the front surface of the heat conducting member 18 to reduce friction therebetween. The heat resistant grease 22 is the same as the heat resistant grease 22 applied onto the front surface of the heater 11, but is not necessarily the same.

A thermistor 20 serving as a temperature detection element abuts on a back surface of the heat conducting member 18, and the thermistor 20 detects a temperature of the heater 11 via the heat conducting member 18. The thermistor 20 is connected to the control unit 32 (see FIG. 1) by a lead wire 21 to provide the detected temperature information to the control unit 32. The control unit 32 controls an AC current for energizing the resistive heating element 11*b* via the power feeding unit so that the heater 11 has a desired temperature. In the present embodiment, the temperature of the thermistor 20 (or the heater 11) is controlled to be 200° C. when LTR size paper passes at a conveyance speed of 50 ppm.

Similarly to the thermistor 20, a thermoswitch (not illustrated) serving as a safety element abuts on the heater 11 via the heat conducting member 18. The thermoswitch is disposed in series with the resistive heating element 11*b* on an electric circuit of the power feeding unit to physically cut off the electric circuit and stop the energization of the resistive heating element 11*b* when the temperature of the heater 11 exceeds an operating temperature of the thermoswitch. The operating temperature of the thermoswitch in the present embodiment is 270° C. The thermoswitch is intended to prevent the fixing unit 6 from having a particularly high temperature under an irregular use condition, for example, when an unexpected sheet P such as cardboard passes through the image forming apparatus 100, and does not operate during normal use.

In addition, the longer the length in the longitudinal direction LD (hereinafter referred to as a longitudinal length) of the heat conducting member 18, the greater the effect of levelling out the temperature of the heater 11. However, if the longitudinal length of the heat conducting member 18 is too long, the temperature in the fixing nip NF decreases, reducing the fixability of the unfixed toner image T. Therefore, the longitudinal length of the heat conducting member 18 is appropriately set in accordance with the characteristics of the image forming apparatus 100 and the fixing unit 6. In the present embodiment, the longitudinal length of the heat conducting member 18 is set to 218 mm, which is the same as the length of the resistive heating element 11*b*. The length in the short direction SD (hereinafter referred to as a short-side length) of the heat conducting member 18 is 7 mm, and the thickness of the heat conducting member 18 is 0.3 mm.

The heater holder 12 supports the heat conducting member 18 and the heater 11. The heater holder 12 includes a heater holder front surface 12*d*, a second seating surface 12*c* disposed at a position recessed upward from the heater holder front surface 12*d*, and a first seating surface 12*b* disposed at a position recessed upward from the second seating surface 12*c*. As illustrated in FIGS. 3 and 4A, the heat conducting member 18 is supported by the first seating surface 12*b*, and the heater 11 is supported by the second seating surface 12*c*.

A step (distance) in the thickness direction TD between the first seating surface 12*b* and the second seating surface 12*c* is preferably equal to or smaller than the thickness of the heat conducting member 18. This is because the contact between the heater 11 and the heat conducting member 18 is not hindered. In the present embodiment, the step is 0.3 mm, which is equal to the thickness of the heat conducting member 18.

Further, the heater holder front surface 12*d* is in contact with the back surface of the fixing film 13 together with the front surface of the heater 11. Therefore, when the heater 11 and the heat conducting member 18 are housed in the heater holder 12, the position of the heater holder front surface 12*d* in the thickness direction TD is preferably substantially the same as the position of the front surface of the heater 11. Therefore, in the present embodiment, the step between the heater holder front surface 12*d* and the second seating surface 12*c* has a thickness of 1.1 mm.

Next, a positional relationship between peripheral members of the heater 11 in the longitudinal direction LD will be described with reference to FIG. 3. The heater holder 12 includes a heater positioning portion 12*a* against which the heater 11 abuts in the longitudinal direction LD. The heater 11 is in contact with the second seating surface 12*c* of the heater holder 12 in a state where the heater 11 abuts against the heater positioning portion 12*a*. One end portion of the heater 11 in the longitudinal direction LD is not in contact with the back surface of the fixing film 13, and the heater 11 is held by the heater holder 12 with the one end portion thereof being held by a holding structure such as a clip with respect to the heater holder 12. The resistive heating element 11*b* may be connected to the power feeding unit via a connector, and the connector may be provided with a clip function for holding the heater 11 in the heater holder 12.

In FIG. 3, a right end of the heater 11 is in contact with the heater positioning portion 12*a*, but a left end of the heater 11 is not in contact with the heater holder 12 in the longitudinal direction LD. That is, in the longitudinal direction, a gap GH is formed between the left end of the heater 11 and the heater holder 12.

On the other hand, the heat conducting member 18 is in contact with the first seating surface 12*b* in the thickness direction TD. Both left and right ends of the heat conducting member 18 are not in contact with the heater holder 12 in the longitudinal direction LD. The heater 11 has protrusions 11*d* and 11*e* to be described below, and both ends of the heat conducting member 18 are spaced apart from the protrusions 11*d* and 11*e* by gaps GR and GL, respectively, in the longitudinal direction LD. In the present embodiment, in a state where the heater 11 is not heated (for example, the heater 11 is at room temperature) and the heat conducting member 18 is disposed at the center between the protrusions 11*d* and 11*e*, the lengths of the gaps GR and GL in the longitudinal direction LD are 0.5 mm.

Configuration of Protrusion

Next, the protrusions 11*d* and 11*e* will be described in detail. As illustrated in FIGS. 3 and 4B, the protrusions 11*d* and 11*e* extend in the thickness direction TD from a back surface 11*m* of the substrate 11*a* of the heater 11 toward the heater holder 12. The protrusions 11*d* and 11*e* are disposed outside the heat conducting member 18 in the longitudinal direction LD. The back surface 11*m* is a surface of the heater 11 provided on the side opposite to the fixing nip NF. That is, the heat conducting member 18 is disposed between the back surface 11*m* of the heater 11 and the first seating surface 12*b* of the heater holder 12.

Figure 5A:
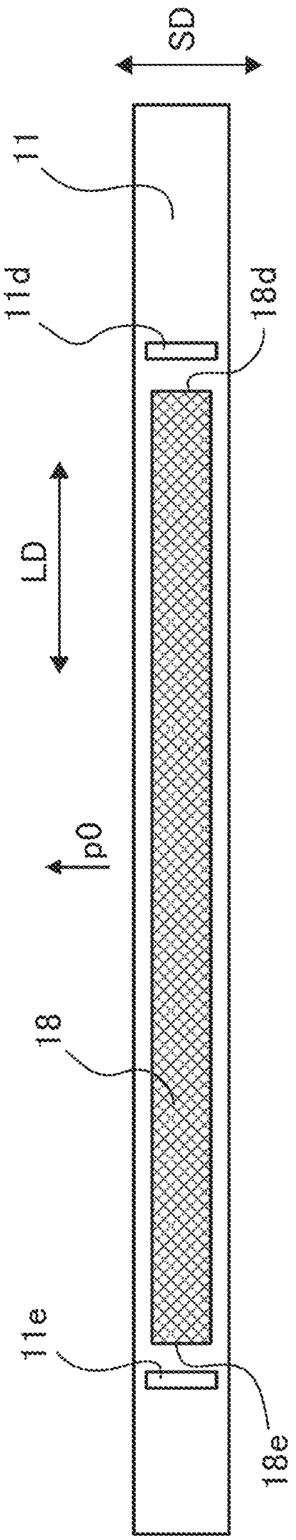
FIG. 5A is a plan view illustrating a heat conducting member and a protrusion according to the first embodiment.

More specifically, the heat conducting member 18 has one end 18*d* and the other end 18*e* in the longitudinal direction LD, and the protrusion 11*d* serving as a first protrusion faces one end 18*d* in the longitudinal direction LD and is disposed on the side opposite to the other end 18*e* with respect to one end 18*d*. As illustrated in FIGS. 3 and 5A, the protrusion 11*d* is disposed so as not to overlap the heat conducting member 18 as viewed in the short direction SD.

The protrusion 11*e* serving as a second protrusion faces the other end 18*e* in the longitudinal direction LD, and is disposed on the side opposite to one end 18*d* with respect to the other end 18*e*. As illustrated in FIGS. 3 and 5A, the protrusion 11*e* is disposed so as not to overlap the heat conducting member 18 as viewed in the short direction SD. The heat conducting member 18 is disposed between the protrusions 11*d* and 11*e* in the longitudinal direction LD, and a distance DS1 between the protrusions 11*d* and 11*e* is longer than a length DS2 of the heat conducting member 18.

The heat conducting member 18 expands and contracts in the longitudinal direction LD with a temperature change, and as a result, moves in the longitudinal direction LD with respect to the heater 11. However, the protrusions 11*d* and 11*e* surround the heat conducting member 18 together with the first seating surface 12*b* and the back surface 11*m* of the heater 11 to restrict a movement of the heat conducting member 18 in the longitudinal direction LD. Therefore, it is not necessary to provide the heat conducting member 18 with an uneven shape for fitting the heat conducting member 18 to the heater 11 and the heater holder 12, and the heat conducting member 18 can be configured in a simple shape, making it possible to reduce the risk of deformation and damage during thermal expansion. In addition, the protrusions 11*d* and 11*e* allow the heat conducting member 18 to be thermally expandable and movable in the longitudinal direction LD within the gaps GR and GL, while restricting a movement of the heat conducting member beyond the gaps GR and GL, making it possible to suppress a positional deviation of the heat conducting member 18 in the longitudinal direction LD.

In the present embodiment, the two protrusions 11*d* and 11*e* are provided on the back surface 11*m* of the heater 11, but the protrusions 11*d* and 11*e* are not limited thereto. For example, only one of the protrusions 11*d* and 11*e* may be provided, but it is preferable to provide the two protrusions 11*d* and 11*e* in terms of the functionality of the protrusions 11*d* and 11*e* to be described below.

FIG. 5A is a plan view illustrating the heat conducting member 18 and the protrusions 11*d* and 11*e* in the present embodiment. As described above, the protrusions 11*d* and 11*e* are disposed outside one end 18*d* and the other end 18*e* of the heat conducting member 18 in the longitudinal direction LD, and extend in the short direction SD. In the present embodiment, the protrusions 11*d* and 11*e* extend in parallel to the sheet conveyance direction p0 and the short direction SD.

Figure 5B:
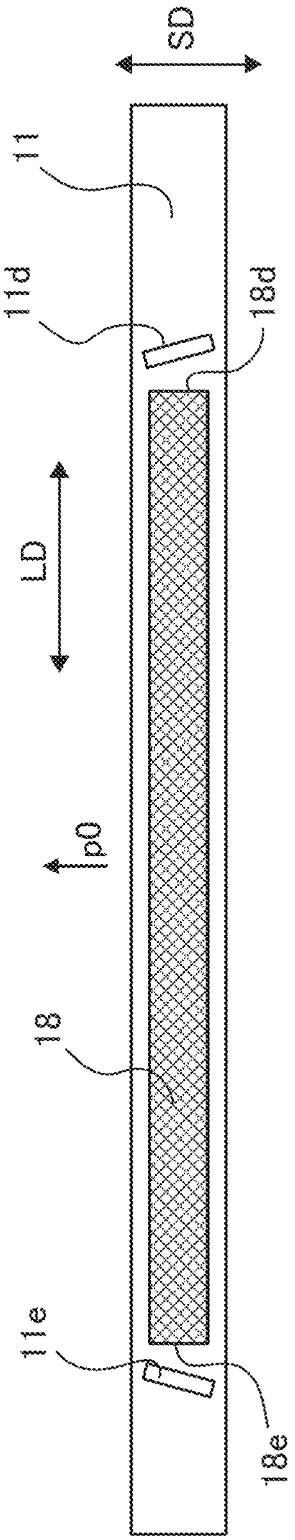
FIG. 5B is a plan view illustrating a modification of the protrusion.
Figure 5C:
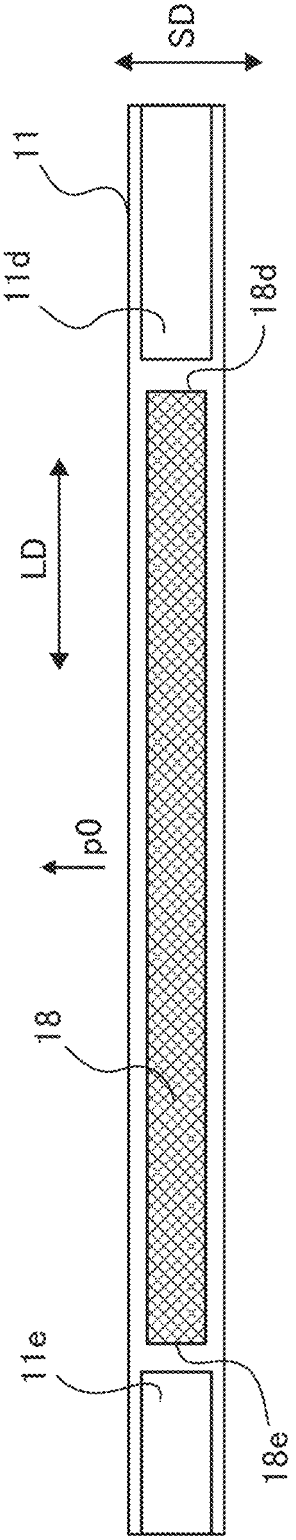
FIG. 5C is a plan view illustrating another modification of the protrusion.

The protrusions 11*d* and 11*e* are not limited to the shape illustrated in FIG. 5A. For example, as illustrated in FIG. 5B, the protrusions 11*d* and 11*e* may extend so as to be inclined with respect to the sheet conveyance direction p0 and the short direction SD. As a result, even when one end 18*d* or the other end 18*e* of the heat conducting member 18 abuts against the protrusion 11*d* or 11*e*, the stress generated in the heat conducting member 18 can be released in the short direction SD, suppressing deformation of the heat conducting member 18. As illustrated in FIG. 5C, the protrusions 11*d* and 11*e* may be shaped to extend in the longitudinal direction LD to the ends of heater 11 in the longitudinal direction LD.

In the present embodiment, the protrusions 11*d* and 11*e* are formed of the same glass material as the protective layer 11*c*, but the protrusions 11*d* and 11*e* are not limited thereto. For example, the protrusions 11*d* and 11*e* may be formed integrally with the substrate 11*a* of the heater 11, or the protrusions 11*d* and 11*e* may be formed by placing small members on the back surface 11*m* of the heater 11, and then coating the small members with the same material as the protective layer 11*c*.

As illustrated in FIGS. 3 and 4B, the protrusions 11*d* and 11*e* are disposed at positions corresponding to the first seating surface 12*b* of the heater holder 12 in the longitudinal direction LD and in the short direction SD. That is, the protrusions 11*d* and 11*e* face the first seating surface 12*b* in the thickness direction TD.

In addition, in order to prevent the protrusions 11*d* and 11*e* from abutting against the first seating surface 12*b*, the thickness thereof is equal to or smaller than the thickness of the heat conducting member 18. On the other hand, in a case where the thickness of the protrusions 11*d* and 11*e* is significantly thin, the effect of restricting a movement of the heat conducting member 18 is weakened. Therefore, the thickness of the protrusions 11*d* and 11*e* is preferably in a range of 65 to 100% of the thickness of the heat conducting member 18. In the present embodiment, the thickness of the protrusions 11*d* and 11*e* is set to 0.25 mm.

In addition, the protrusions 11*d* and 11*e* may abut on end portions of the heat conducting member 18 in the longitudinal direction LD as the heat conducting member 18 thermally expands. In order for the heat conducting member 18 to stably abut on the protrusions 11*d* and 11*e*, the length of the protrusions 11*d* and 11*e* in the short direction SD is preferably equal to or longer than the length of the heat conducting member 18 in the short direction SD. In the present embodiment, the length of the protrusions 11*d* and 11*e* in the short direction SD is set to 8 mm.

Effect of Protrusion

Figure 6:
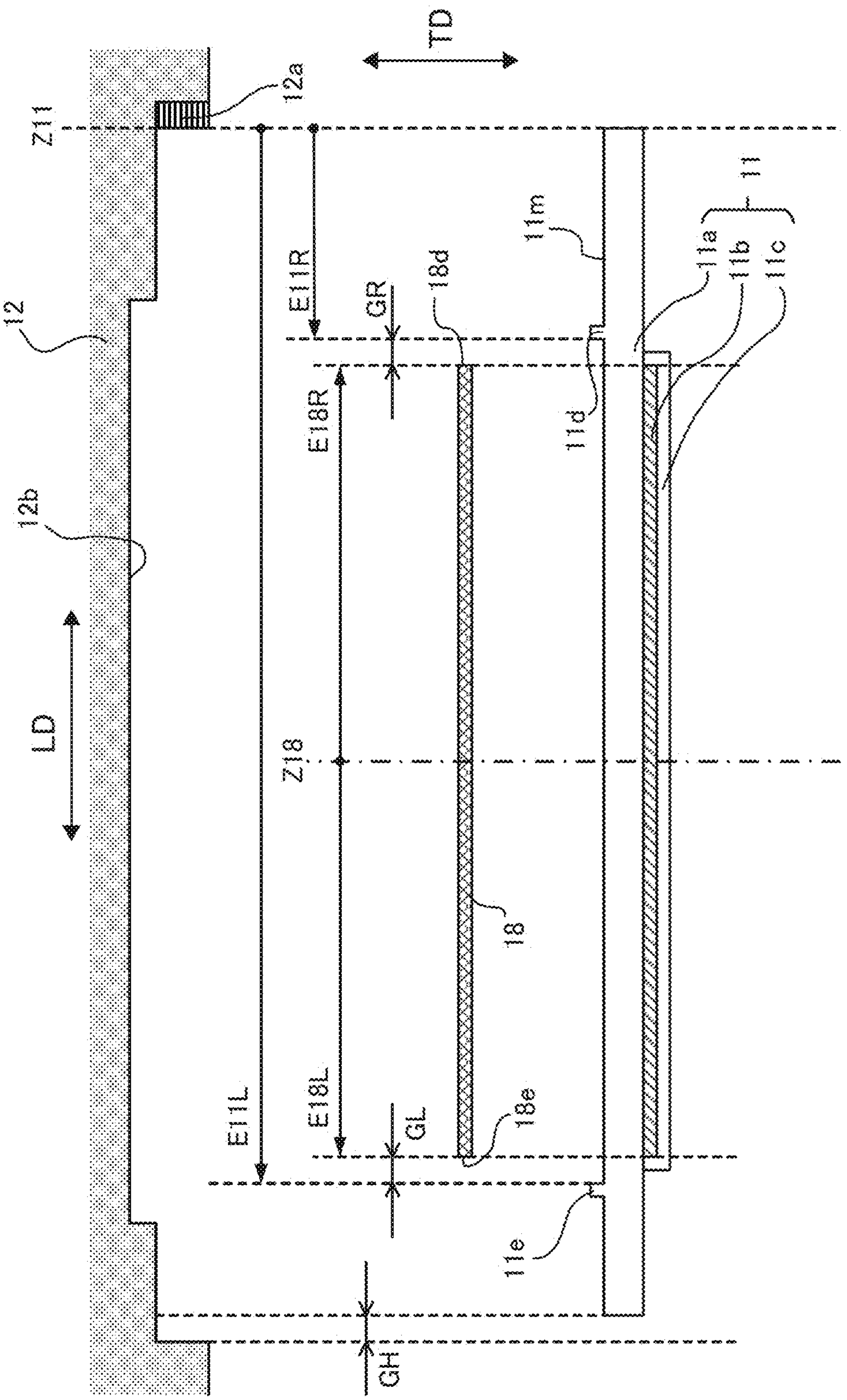
FIG. 6 is a cross-sectional view for explaining thermal expansion of a heater and a heat conducting member.

Next, an effect of the protrusions 11*d* and 11*e* will be described in detail with reference to FIG. 6. FIG. 6 is a cross-sectional view for explaining thermal expansion of the heater 11 and the heat conducting member 18. FIG. 6 illustrates a cross section parallel to the longitudinal direction LD and the thickness direction TD.

As illustrated in FIG. 6, the right end (one end in the longitudinal direction LD) of the heater 11 abuts against the positioning portion 12*a* of the heater holder 12, and the left end (the other end in the longitudinal direction LD) of the heater 11 is spaced apart from the heater holder 12 by a gap GH. Therefore, when the heater 11 is heated and thermally expands, the protrusion 11*d* of the heater 11 facing one end 18*d* of the heat conducting member 18 expands in a direction indicated by an arrow E11R from a position Z11 as a starting point. Similarly, the protrusion 11*e* of the heater 11 facing the other end 18*e* of the heat conducting member 18 expands in a direction indicated by an arrow E11L from the position Z11 as a starting point. The position Z11 is a position in the longitudinal direction LD of a contact portion where the right end of the heater 11 and the positioning portion 12*a* are in contact with each other.

On the other hand, the heat conducting member 18 is disposed between the back surface 11*m* of the heater 11 and the first seating surface 12*b* of the heater holder 12, but is not fixed in the longitudinal direction LD. Therefore, the heat conducting member 18 is movable with respect to the heater 11 between the protrusions 11*d* and 11*e*. In addition, the heat conducting member 18 thermally expands from a certain point as a starting point. In FIG. 6, it is assumed that the heat conducting member 18 thermally expands from a starting point Z18, which is a center position of the heat conducting member 18 in the longitudinal direction LD. That is, one end 18*d* of the heat conducting member 18 expands in a direction indicated by an arrow E18R, and the other end 18*e* of the heat conducting member 18 expands in a direction indicated by an arrow E18L.

As described above, when the heater 11 and the heat conducting member 18 thermally expand with the operation of the fixing unit 6, the gap GR decreases because the protrusion 11*d* moves in the left direction and one end 18*d* of the heat conducting member 18 moves in the right direction in FIG. 6. On the other hand, when the heater 11 and the heat conducting member 18 thermally expand, the gap GL decreases at a slower pace than the gap GR because the protrusion 11*e* moves in the left direction and the other end 18*e* of the heat conducting member 18 also moves in the left direction in FIG. 6.

Figure 7:
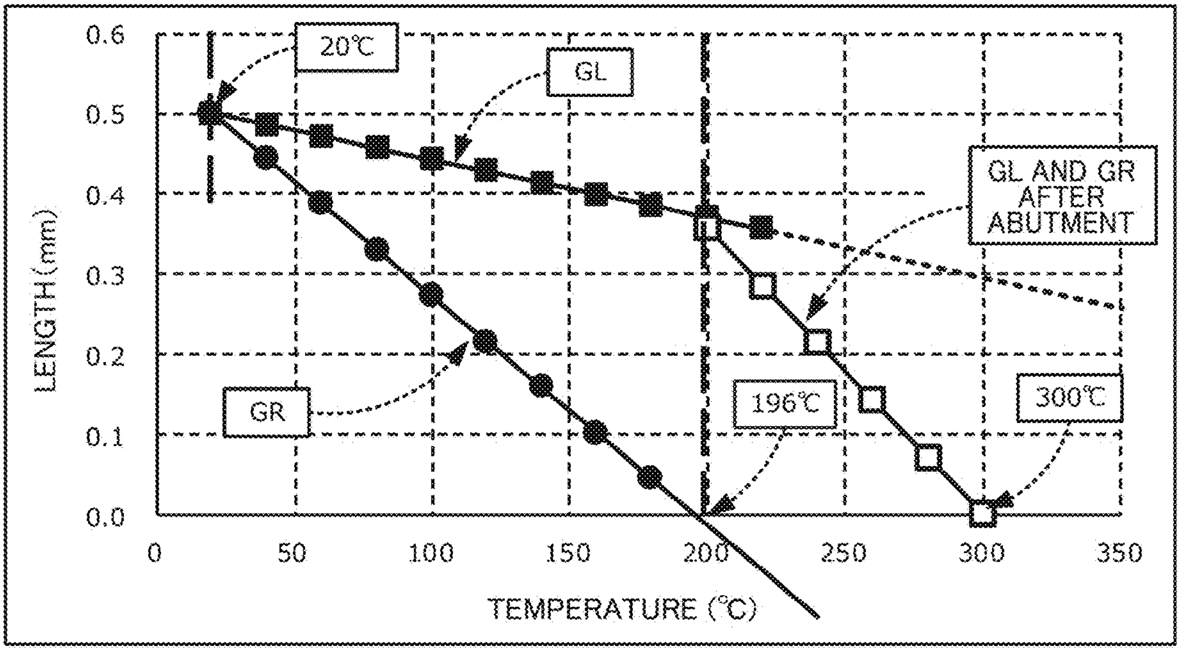
FIG. 7 is a graph illustrating changes in lengths of gaps in the longitudinal direction when the heater and the heat conducting member thermally expand.

FIG. 7 is a graph illustrating changes in the lengths of the gaps GL and GR in the longitudinal direction LD when the heater 11 and the heat conducting member 18 thermally expand. The data in the graph are calculated values, and the longitudinal length and the thermal conductivity of each member involved in the calculation are as described above. In the graph illustrated in FIG. 7, the horizontal axis represents temperatures of the heater 11 and the heat conducting member 18, and the vertical axis represents longitudinal lengths of the gaps GL and GR. In FIG. 7, it is assumed that the heater 11 and the heat conducting member 18 have the same temperature, and in this case, a temperature detected by the thermistor 20 (hereinafter also simply referred to as a detected temperature) is also the same as the temperatures of the heater 11 and the heat conducting member 18.

The longitudinal lengths of the gaps GL and GR are both 0.5 mm when the temperature detected by the thermistor 20 is 20° C., and decrease as the heater 11 and the heat conducting member 18 thermally expand. When one end 18*d* and the other end 18*e* of the heat conducting member 18 abut against the protrusions 11*d* and 11*e*, the longitudinal length of the gaps GL and GR become 0 mm, that is, the vertical axis in FIG. 7 becomes 0 mm. The horizontal axis indicates a temperature at that point when one end 18*d* and the other end 18*e* of the heat conducting member 18 abut against the protrusions 11*d* and 11*e* (hereinafter referred to as an abutment temperature). That is, the abutment temperature is a temperature detected by the thermistor 20 when the distance DS1 between the protrusions 11*d* and 11*e* illustrated in FIG. 3 becomes equal to the length DS2 of the heat conducting member 18.

In FIG. 7, data about the gap GR is indicated by ●. The longitudinal length of the gap GR becomes 0 mm when the detected temperature is 196° C., and at this time, one end 18*d* of the heat conducting member 18 abuts against the protrusion 11*d*. In FIG. 7, data about the gap GL is indicated by ■. The longitudinal length of the gap GL does not become 0 mm even when the detected temperature is 350° C., and the other end 18*e* of the heat conducting member 18 and the protrusion 11*e* do not abut against each other unless the heater 11 is heated to a temperature higher than that on the gap GR side.

Here, as described above, the starting point Z18 of expansion of the heat conducting member 18 is not a structurally strongly fixed point, but a starting point of temporary expansion of the heat conducting member 18 that can relatively freely move in the longitudinal direction LD. Therefore, after one end 18*d* of the heat conducting member 18 abuts against the protrusion 11*d* at the detected temperature of 196° C., when the temperature of the heater 11 further rises, the heat conducting member 18 thermally expands toward the other end 18*e* in the longitudinal direction LD from the protrusion 11*d* as a starting point. Therefore, the longitudinal length of gap GL decreases more rapidly when the detected temperature is equal to or higher than 196° C. than when the detected temperature is lower than 196° C. (the data at that time is indicated by u in FIG. 7).

If the detected temperature rises up to 300° C., both the gap GR and the gap GL become 0 mm, and both one end 18*d* and the other end 18*e* of the heat conducting member 18 abut against the protrusions 11*d* and 11*e*. Further, when the detected temperature exceeds 300° C. and the temperature of the heater 11 rises, one end 18*d* and the other end 18*e* of the heat conducting member 18 increase their pressing force to the protrusions 11*d* and 11*e* with the thermal expansion of the heat conducting member 18, and the heat conducting member 18 may be deformed or damaged.

On the other hand, as described above, in the present embodiment, the control unit 32 controls the heater 11 so that the temperature detected by the thermistor 20 becomes 200° C., and the temperatures of the heater 11 and the heat conducting member 18 including temperature variations do not exceed 270° C., which is an operating temperature of the thermoswitch. Therefore, both the gaps GR and GL do not become 0 mm, and one end 18*d* and the other end 18*e* of the heat conducting member 18 are not excessively pressed against the protrusions 11*d* and 11*e*, such that the heat conducting member 18 is not deformed or damaged. In other words, when the sheet P is conveyed by the fixing nip NF, the protrusions 11*d* and 11*e* do not simultaneously abut on the heat conducting member 18. Therefore, if the protrusions 11*d* and 11*e* and the heat conducting member 18 are arranged in the longitudinal direction LD so that the detected temperature is 300° C. and the gaps GR and GL are 0 mm, deformation or damage to the heat conducting member 18 can be reliably avoided.

Further, in the fixing unit 6 according to the present embodiment, the longitudinal lengths of the gaps GR and GL are both set to 0.5 mm when the temperature detected by the thermistor 20 is 20° C. as described above. By increasing the longitudinal lengths of the gaps GR and GL, the abutment temperature can be increased. However, in this case, since the movable range of the heat conducting member 18 in the longitudinal direction LD is increased, the heat conducting member 18 may be significantly closer to the protrusion 11*d* or the protrusion 11*e* in the longitudinal direction LD.

For example, in a state where the heat conducting member 18 is close to the protrusion 11*d*, one end 18*d* of the heat conducting member 18 moves to the outside of the resistive heating element 11*b* in the longitudinal direction LD, and the heat conducting member 18 levels out the temperature up to a range where the resistive heating element 11*b* does not exist. As a result, the temperature in the fixing nip NF decreases, reducing the fixability of the toner onto the sheet P. In addition, since a partial portion (a left end portion) of the resistive heating element 11*b* is located outside the other end 18*e* of the heat conducting member 18 in the longitudinal direction LD, the temperature in the fixing nip NF increases in that range, excessively heating the left end portion of the resistive heating element 11*b* with respect to the sheet P and the toner.

Meanwhile, the accuracy in image writing position of the image forming apparatus such as a printer or a copier is generally ±2 mm. This variation in accuracy is caused by a variation in the conveyed position of the sheet P in the image forming apparatus 100. In the fixing unit 6, the arrangement of each member in the longitudinal direction LD is designed so that stable fixing performance can be obtained even if such a variation in the conveyed position of the sheet P occurs. On the other hand, a positional deviation of the heat conducting member 18 in the longitudinal direction LD caused by the longitudinal lengths of the gaps GR and GL is ±0.5 mm, which is sufficiently smaller than the variation in the conveyed position of the sheet P. Therefore, even if the position of the heat conducting member 18 deviates in the longitudinal direction LD within the range of the gaps GR and GL set to 0.5 mm, the fixability of the toner onto the sheet P is not affected.

As described above, in the fixing unit 6 according to the present embodiment, the heat conducting member 18 is disposed on the back surface 11*m* of the heater 11, and the protrusions 11*d* and 11*e* are provided on the back surface 11*m* of the heater 11. Since the protrusions 11*d* and 11*e* face one end 18*d* and the other end 18*e* of the heat conducting member 18 with gaps GR and GL of appropriate longitudinal lengths therebetween, a movement of the heat conducting member 18 in the longitudinal direction LD can be restricted between the protrusions 11*d* and 11*e*. Then, since the heat conducting member 18 is not processed into a shape that fits the heater 11, deformation or damage caused due to residual stress resulting from the processing does not occur. With such a configuration, stable fixing performance can be obtained without causing deformation or damage to the heat conducting member 18, and image defects can be reduced.

Next, in each case where the longitudinal length of the gaps GR and GL when the detected temperature is 20° C. is changed, the temperature of the heater 11 or the detected temperature at which the gaps GR and GL become 0 mm is shown in Table 1 below.

TABLE 1

| | Longitudinal length of gaps GR and GL at 20° C. | Temperature when gap GR is 0 mm | Temperature when gap GL is 0 mm |
|---|---|---|---|
| Example 1 | 0.5 mm | 196° C. | 300° C. |
| Comparative example 1 | 0.25 mm | 108° C. | 160° C. |
| Comparative example 2 | 0.8 mm | >300° C. | >300° C. |

The temperature values in Table 1 are calculated values as described above. In the present embodiment (Example 1), the longitudinal length of the gaps GR and GL when the detected temperature is 20° C. is 0.5 mm, and the detected temperature at which the gap GR is 0 mm, that is, one end 18*d* of the heat conducting member 18 abuts against the protrusion 11*d*, is 196° C. In addition, the detected temperature at which the gap GL is 0 mm, that is, the other end 18*e* of the heat conducting member 18 abuts against the protrusion 11*e*, is 300° C.

Further, the longitudinal length of the gaps GR and GL when the detected temperature is 20° C. is changed to 0.25 mm in Comparative Example 1, and the longitudinal length of the gaps GR and GL when the detected temperature is 20° C. is changed to 0.8 mm in Comparative Example 2. In Comparative Example 1, each of the protrusions 11*d* and 11*e* according to the present embodiment is moved inward by 0.25 mm in the longitudinal direction LD. In Comparative Example 2, each of the protrusions 11*d* and 11*e* according to the present embodiment is moved outward by 0.3 mm in the longitudinal direction LD.

In Comparative Example 1, the detected temperature at which the gap GR is 0 mm, that is, one end 18*d* of the heat conducting member 18 abuts against the protrusion 11*d*, is 108° C. In addition, the detected temperature at which the gap GL is 0 mm, that is, the other end 18*e* of the heat conducting member 18 abuts against the protrusion 11*e*, is 160° C. In the fixing unit 6 according to the present embodiment, since the target temperature of the heater 11 is set to 200° C. during an image forming job, one end 18*d* and the other end 18*e* of the heat conducting member 18 abut against the protrusions 11*d* and 11*e*, respectively, at the time of the image forming job. This may cause deformation or damage to the heat conducting member 18, which is not preferable.

In Comparative Example 2, the detected temperature at which the gap GR is 0 mm, that is, one end 18*d* of the heat conducting member 18 abuts against the protrusion 11*d*, is higher than 300° C. In addition, the detected temperature at which the gap GL is 0 mm, that is, the other end 18*e* of the heat conducting member 18 abuts against the protrusion 11*e*, is also higher than 300° C. Therefore, there is no possibility that one end 18*d* and the other end 18*e* of the heat conducting member 18 abut against the protrusions 11*d* and 11*e* at the time of an image forming job. On the other hand, the movable range of the heat conducting member 18 in the longitudinal direction LD is 0.3 mm larger on each of the gap GR side and the gap GL side than that in the present embodiment. This may cause a positional deviation of the heat conducting member 18 in the longitudinal direction LD, thereby making the temperature of the fixing nip NF unstable, and reducing the fixability of the toner.

Therefore, the longitudinal length of the gaps GR and GL is preferably as small as possible within a range of the length secured such that the heat conducting member 18 does not abut against both the protrusions 11*d* and 11*e* even when the heat conducting member 18 thermally expands during an image forming job. In Table 1 described above, the present embodiment (Example 1) is more preferable than Comparative Examples 1 and 2.

Next, it was confirmed whether the above-described effect can be similarly obtained in a case where the starting point Z18 of expansion of the heat conducting member 18 is displaced in the longitudinal direction LD as shown in Table 2 below.

TABLE 2

| | Longitudinal length of gaps GR and GL at 20° C. | Displacement of starting point Z18 of expansion from longitudinal center | Temperature when gap GR is 0 mm | Temperature when gap GL is 0 mm |
|---|---|---|---|---|
| Example 1 | 0.5 mm | 0 mm | 196° C. | 300° C. |
| Example 1-1 | 0.5 mm | 30 mm leftward | 160° C. | 300° C. |
| Example 1-2 | 0.5 mm | 60 mm leftward | 137° C. | 300° C. |
| Example 1-3 | 0.5 mm | 30 mm rightward | 255° C. | 300° C. |
| Example 1-4 | 0.5 mm | 60 mm rightward | 300° C. | 252° C. |

In Table 2, Example 1 was carried out under the above-described condition according to the present embodiment described above, in which the starting point Z18 of expansion of the heat conducting member 18 coincides with the center position of the heat conducting member 18 in the longitudinal direction LD. On the other hand, each of Examples 1-1 to 1-4 was carried out under a condition in which the starting point Z18 is displaced leftward or rightward by 30 mm or 60 mm in the longitudinal direction LD of FIG. 3 from the center position of the heat conducting member 18 in the longitudinal direction LD. The temperatures at which the gaps GR and GL become 0 mm under each condition are calculated values, similarly to those in Table 1. This confirmation was performed because the starting point Z18 of expansion is easily displaced in the longitudinal direction LD due to minute load unevenness in the fixing nip NF when the sheet P is conveyed to the fixing unit 6. Therefore, in Table 2, calculations were performed assuming significantly large displacement of up to 60 mm.

Under the conditions in Examples 1-1 to 1-3, the detected temperature when the longitudinal length of the gap GL becomes 0 mm is 300° C. In the fixing unit 6, since the target temperature of the heater 11 is 200° C. and the operating temperature of the thermoswitch is 270° C., both one end 18*d* and the other end 18*e* of the heat conducting member 18 do not abut against the protrusions 11*d* and 11*e* at the time when the image forming apparatus 100 is actually used.

Under the condition in Example 1-4, the other end 18*e* of the heat conducting member 18 abuts against the protrusion 11*e* before one end 18*d* of the heat conducting member 18 abuts against the protrusion 11*d*, but the abutment temperature at which both one end 18*d* and the other end 18*e* of the heat conducting member 18 abut against the protrusions 11*d* and 11*e* is 300° C. Therefore, at the time when the image forming apparatus 100 is actually used, both one end 18*d* and the other end 18*e* of the heat conducting member 18 do not abut against the protrusions 11*d* and 11*e*, as is the case with the conditions in Examples 1-1 to 1-3.

Therefore, by appropriately setting the longitudinal length of the gaps GR and GL, deformation or damage to the heat conducting member 18 can be reduced even under a condition where the starting point Z18 of expansion of the heat conducting member 18 is biased to the left and right in the longitudinal direction LD.

First Modification of First Embodiment

Next, a first modification of the first embodiment will be described. In the first modification of the first embodiment, the longitudinal length of the heat conducting member 18 is shorter than that in the first embodiment. Therefore, a configuration thereof similar to that of the first embodiment will not be illustrated or will be described with the same reference signs being given in the drawings.

Figure 8:
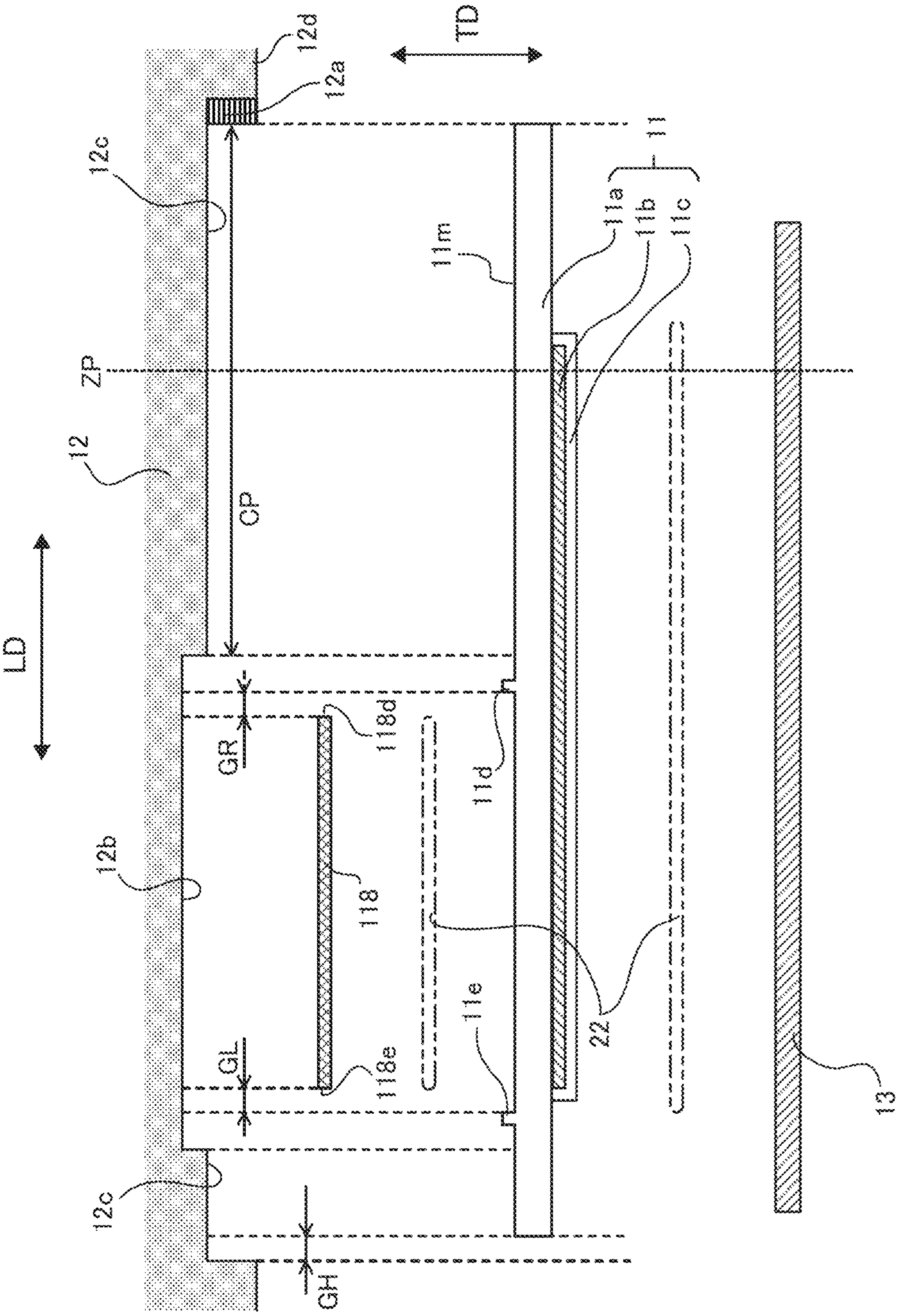
FIG. 8 is a cross-sectional view illustrating a cross section parallel to the longitudinal direction of a peripheral configuration of a heater according to a first modification of the first embodiment.

In the first embodiment, the longitudinal length of the heat conducting member 18 is set to be the same as that of the resistive heating element 11*b*, but the longitudinal length of the heat conducting member 18 is not limited thereto. FIG. 8 is a cross-sectional view illustrating a cross section parallel to the longitudinal direction LD of a peripheral configuration of the heater 11 according to the first modification of the first embodiment. As illustrated in FIG. 8, a heat conducting member 118 according to the present first modification is shorter than the resistive heating element 11*b* in the longitudinal direction LD, and is disposed closer to the left side of the heater 11.

In the present first modification, the sheet P is conveyed with one end thereof in a width direction parallel to the longitudinal direction LD being set to a reference position ZP. That is, the sheet P is conveyed in a state where one side (one end in the width direction) of the sheet P coincides with the reference position ZP regardless of the size of the sheet. For example, the sheet P is conveyed while one side thereof is in rubbing contact with a reference surface provided in a conveyance guide (not illustrated), so that the sheet P is conveyed along the reference position ZP on a one-side basis.

In such a configuration, the sheet non-passage range in the fixing nip NF when a sheet P having a narrow width is conveyed is only the left side in FIG. 8, and the heat conducting member 118 is disposed to correspond to such a sheet non-passage range, thereby making it possible to configure the heat conducting member 118 to be short. By shortening the longitudinal length of the heat conducting member 118, a change in length of the heat conducting member 118 during thermal expansion can be reduced, so that the gaps GR and GL can be set to be narrower than those in the first embodiment described above.

In addition, in the configuration as in the present first modification, the starting point of expansion of the heat conducting member 118 is often one end 118*d* of the heat conducting member 118. This is because the position of the starting point is affected by the pressure distribution and the temperature distribution in the longitudinal direction LD of the fixing nip NF. For example, in a case where one end 118*d* of the heat conducting member 118 is the starting point of expansion, the heat conducting member 118 thermally expands only toward the other end 118*e*. For this reason, only the protrusion 11*e* may be provided on the heater 11 without providing the protrusion 11*d*.

In the heater holder 12, it is also preferable that the length of the first seating surface 12*b* corresponding to the heat conducting member 118 is shorter than that in the first embodiment, and the length of the second seating surface 12*c* is longer than that in the first embodiment. In FIG. 8, the heater 11 may be bonded to a region CP of the second seating surface 12*c* via a heat-resistant adhesive.

Second Modification of First Embodiment

Next, a second modification of the first embodiment will be described. In the second modification of the first embodiment, protrusions 11*f* and 11*g* are provided in addition to the protrusions 11*d* and 11*e* on the back surface 11*m* of the heater 11. Therefore, a configuration thereof similar to that of the first embodiment will not be illustrated or will be described with the same reference signs being given in the drawings.

Figure 9A:
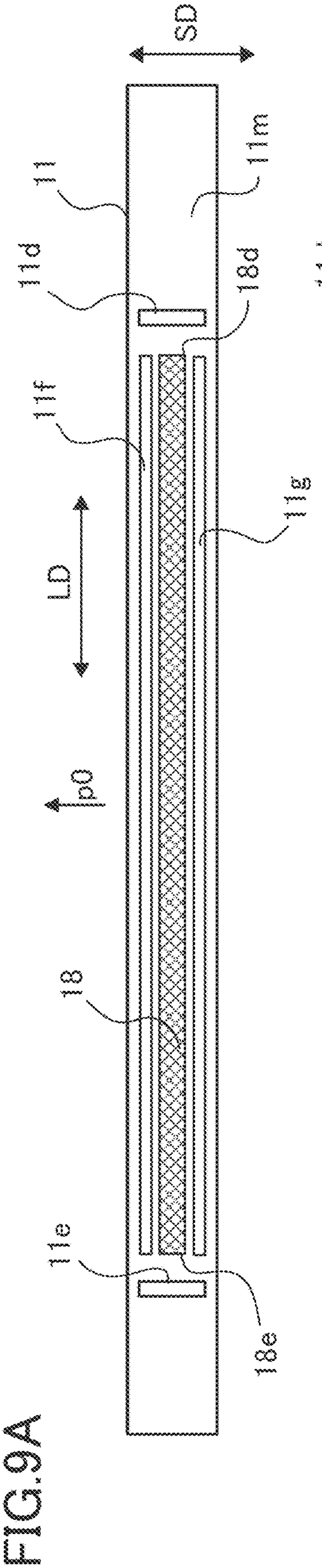
FIG. 9A is a plan view illustrating a protrusion according to a second modification of the first embodiment.

As illustrated in FIG. 9A, the protrusion 11*f* serving as a third protrusion disposed on one side in the short direction SD of the heat conducting member 18 and the protrusion 11*g* serving as a fourth protrusion disposed on the other side in the short direction SD of the heat conducting member 18 extend from the back surface 11*m* of the heater 11. In other words, the heat conducting member 18 is disposed with gaps between the protrusions 11*f* and 11*g* in the short direction SD. In addition, the protrusions 11*f* and 11*g* are disposed on opposite sides in the short direction SD with the heat conducting member 18 interposed therebetween while facing the heat conducting member 18, and are disposed so as not to overlap the heat conducting member 18 when viewed in the longitudinal direction LD.

There has been known a configuration in which a pressure of a load applied to the fixing film unit 19 is reduced in order for a user to easily remove a jammed sheet when the sheet P is stuck in the fixing nip NF, that is, when a so-called jam occurs. In such a pressure-reduced state, in a case where the jammed sheet is pulled out and removed in a direction or angle different from the normal sheet conveyance direction p0 of the sheet P, there is a possibility that the heat conducting member 18 is deviated in the short direction SD with respect to the heater 11. This is because the heat conducting member 18 is not fixed to the first seating surface 12*b* of the heater holder 12 or the back surface 11*m* of the heater 11. The protrusions 11*f* and 11*g* according to the present modification have an effect of preventing such a deviation of the heat conducting member 18 in the short direction SD.

A change of the heat conducting member 18 in the short-side length during thermal expansion is not as large as that in the longitudinal direction LD. Therefore, gaps between the heat conducting member 18 and the protrusions 11*f* and 11*g* in the short direction SD can be set to be narrower than the gaps GR and GL. In addition, in order to prevent the protrusions 11*f* and 11*g* from abutting against the first seating surface 12*b*, the thickness thereof is equal to or smaller than the thickness of the heat conducting member 18. On the other hand, in a case where the thickness of the protrusions 11*f* and 11*g* is significantly thin, the effect of restricting a movement of the heat conducting member 18 is weakened. Therefore, the thickness of the protrusions 11*f* and 11*g* is preferably in a range of 65 to 100% of the thickness of the heat conducting member 18. In the present modification, the thickness of the protrusions 11*f* and 11*g* is set to 0.25 mm, which is the same as the thickness of the protrusions 11*d* and 11*e*.

If the protrusions 11*f* and 11*g* and the protrusions 11*d* and 11*e* are structurally connected to each other, this affects displacement of the protrusions 11*d* and 11*e* when the heater 11 thermally expands. Therefore, it is preferable that the protrusions 11*f* and 11*g* and the protrusions 11*d* and 11*e* are not connected to each other.

Figure 9B:
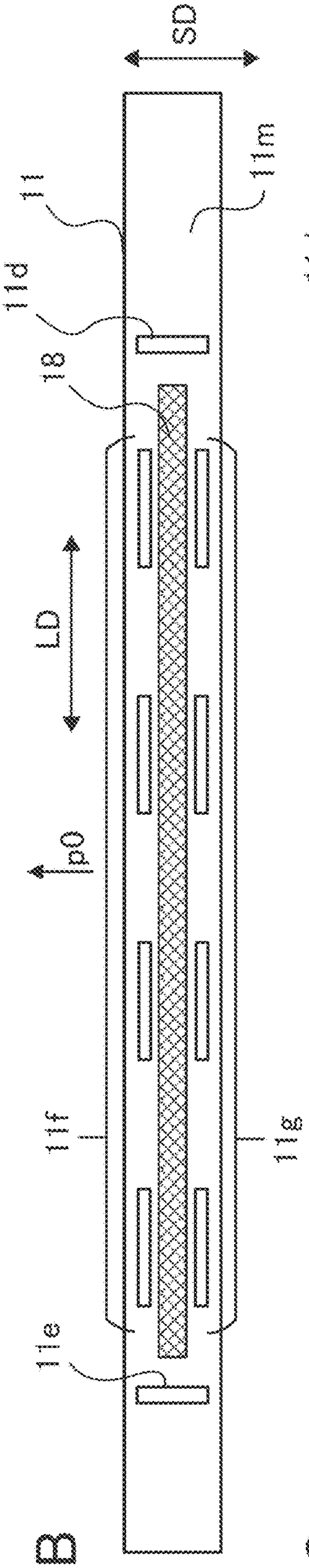
FIG. 9B is a plan view illustrating a modification of the protrusion.

As illustrated in FIG. 9B, the protrusions 11*f* and 11*g* may be discontinuous in the longitudinal direction LD as long as the effect of restricting a movement of the heat conducting member 18 is not lost.

Figure 9C:
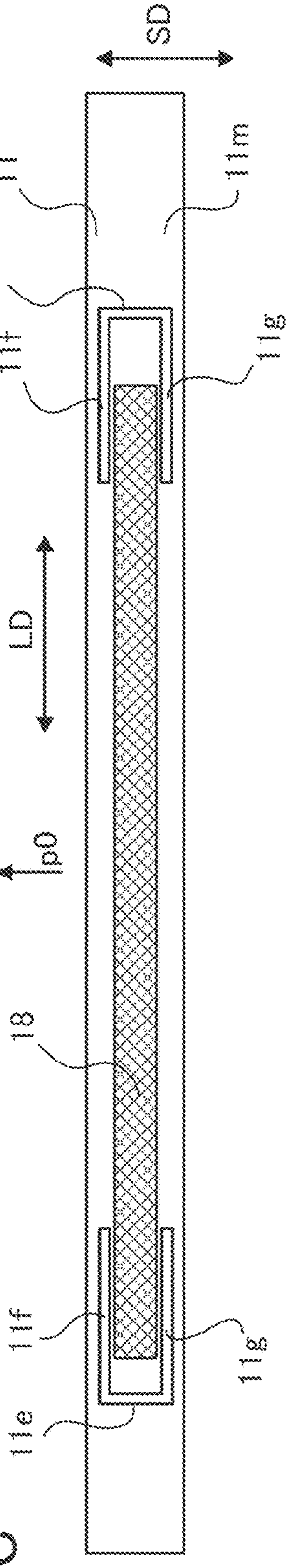
FIG. 9C is a plan view illustrating another modification of the protrusion.

Furthermore, as illustrated in FIG. 9C, in a case where the protrusions 11*f* and 11*g* are provided only at the longitudinal end portions, this hardly affects displacement of the protrusions 11*d* and 11*e*. Therefore, the protrusions 11*f* and 11*g* and the protrusions 11*d* and 11*e* may be connected to each other.

As described above, by providing the protrusions 11*f* and 11*g* outside the heat conducting member 18 in the short direction SD, it is possible to reduce a deviation of the heat conducting member 18 in the short direction SD.

Second Embodiment

Next, a second embodiment of the present invention will be described. In the second embodiment, a heater 110 is used instead of the heater 11 according to the first embodiment. Therefore, a configuration thereof similar to that of the first embodiment will not be illustrated or will be described with the same reference signs being given in the drawings.

Figure 10A:
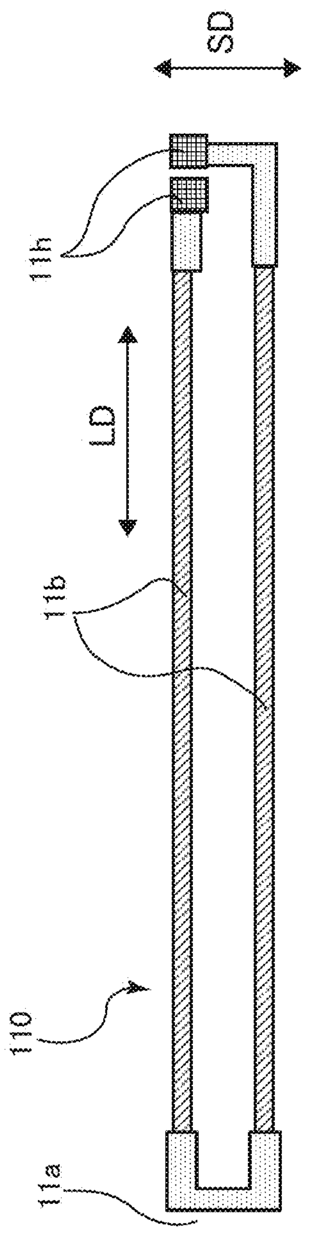
FIG. 10A is a front view illustrating a front surface of a heater according to a second embodiment.
Figure 10B:
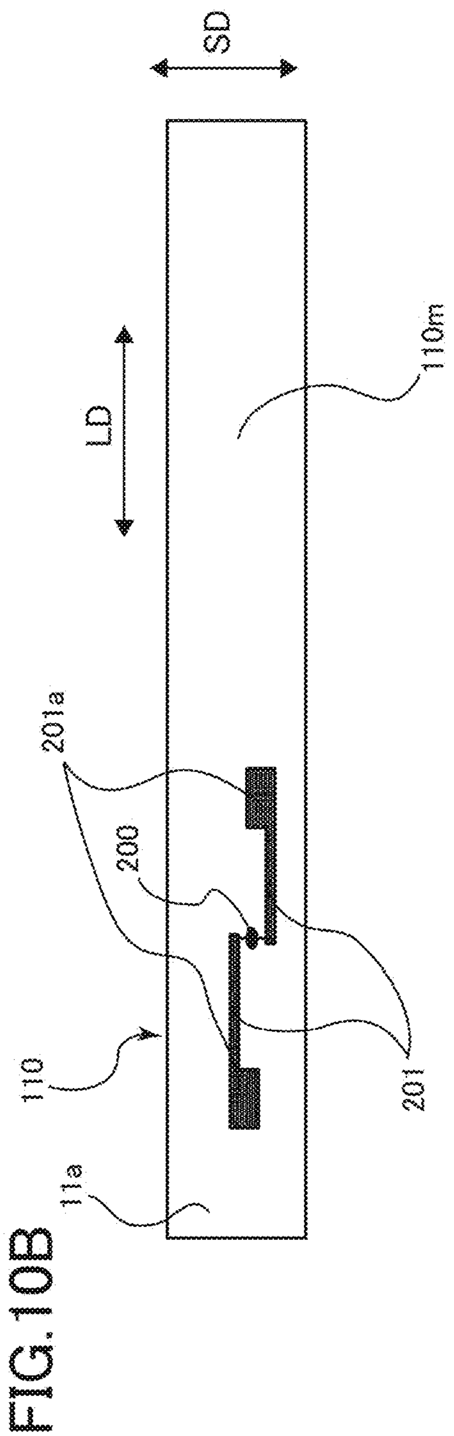
FIG. 10B is a front view illustrating a back surface of the heater.

FIG. 10A is a front view illustrating a front surface of the heater 110 according to the present embodiment, and FIG. 10B is a front view illustrating a back surface 110*m* of the heater 110. As illustrated in FIG. 10A, similarly to the heater 11 according to the first embodiment, the heater 110 includes a substrate 11*a*, a resistive heating element 11*b*, and a protective layer (not illustrated) on the front surface thereof. The resistive heating element 11*b* is energized with an AC current through a contact 11*h* by a power feeding unit (not illustrated) to generate heat.

As illustrated in FIG. 10B, on the back surface of heater 110, a thermistor 200 serving as a temperature detection unit that detects a temperature of the heater 110 and a printed wire 201 for controlling the thermistor are directly provided on the substrate 11*a* in an adhesive and printed manner. The printed wire 201 serving as a wiring pattern has a connecting portion 201*a* to provide detected temperature information to the control unit 32 (see FIG. 1) via a lead wire (not illustrated) electrically connected to the connecting portion 201*a*. Note that the thermistor 200 according to the present embodiment can accurately measure a temperature of the heater 110 without using a useless member, because a chip thermistor that can be mounted on the substrate 11*a* is used therefor. At the same time, the space can be saved as compared with that in the configuration of the thermistor 20 (see FIG. 3) according to the first embodiment.

Peripheral Configuration of Heater

Figure 11:
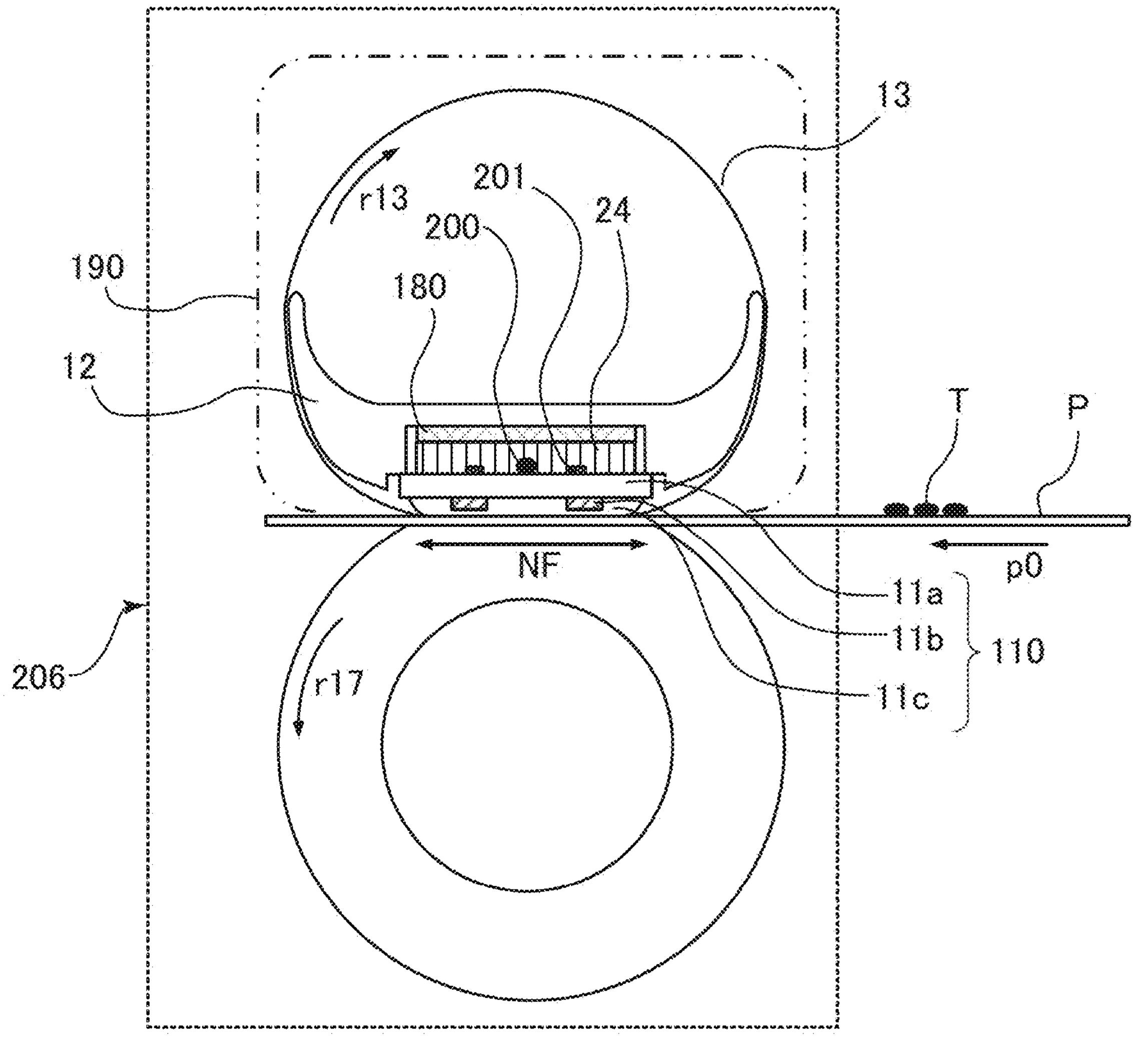
FIG. 11 is a cross-sectional view illustrating a fixing unit.

Next, a peripheral configuration of the heater 110 will be described. FIG. 11 is a cross-sectional view when the heater 110 is disposed in a fixing unit 206. In the present embodiment, the fixing film unit 190 is used instead of the fixing film unit 19 according to the first embodiment. The fixing film unit 190 includes a fixing film 13 and a heater 110 disposed in the fixing film 13. Further, the fixing film unit 190 includes a heater holder 12 supporting the heater 110, and an insulating layer 24 and a heat conducting member 180 disposed between the back surface 110*m* of the heater 110 and the heater holder 12. The insulating layer 24 is provided integrally with the back surface 110*m* of the heater 110 so as to cover at least a part of the thermistor 200 and the printed wire 201, and is disposed between the back surface 110*m* and the heat conducting member 180. In the present embodiment, the insulating layer 24 is provided integrally with the back surface 110*m* of the heater 110, but the insulating layer 24 is not limited thereto. For example, the insulating layer 24 may be provided integrally with the heat conducting member 180. The basic operation of the fixing unit 206 and the effect of the heat conducting member 180 are the same as those of the fixing unit 6 described in the first embodiment.

In many cases, a graphite sheet or a metal plate of aluminum, iron, copper, or the like having high thermal conductivity is used as the heat conducting member 180. Thus, if the heat conducting member is directly disposed on the thermistor 200 or the printed wire 201, a short circuit or a leakage may occur. In order to prevent a short circuit or a leakage, in the present embodiment, the insulating layer 24 is provided on the heater 110 as described above, such that the heat conducting member 180 does not directly contact the thermistor 200 and the printed wire 201. The heat conducting member 180 may be made of a material other than the materials described above as long as the heat conducting member 180 has a thermal conductivity of 80 [W/mK] or more. Furthermore, for example, glass, polyimide, or the like is used for the insulating layer 24.

Peripheral Configurations and Operations of Thermistor and Printed Wire

Figure 12:
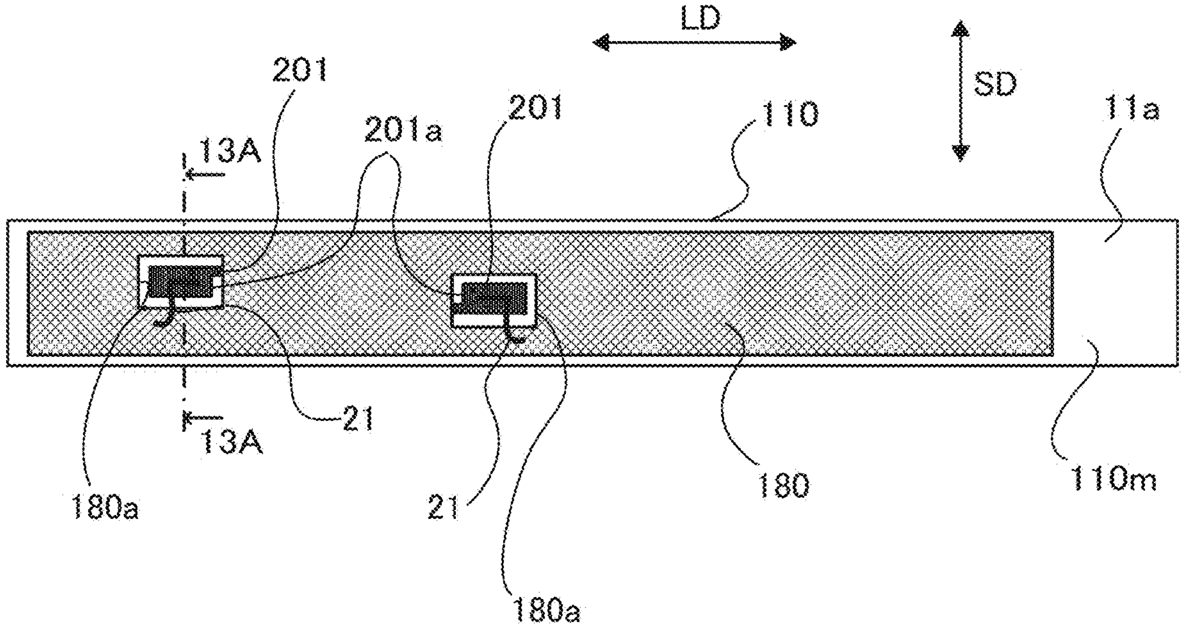
FIG. 12 is a front view illustrating the back surface of the heater in a state where the heat conducting member is disposed on the heater.
Figure 13:
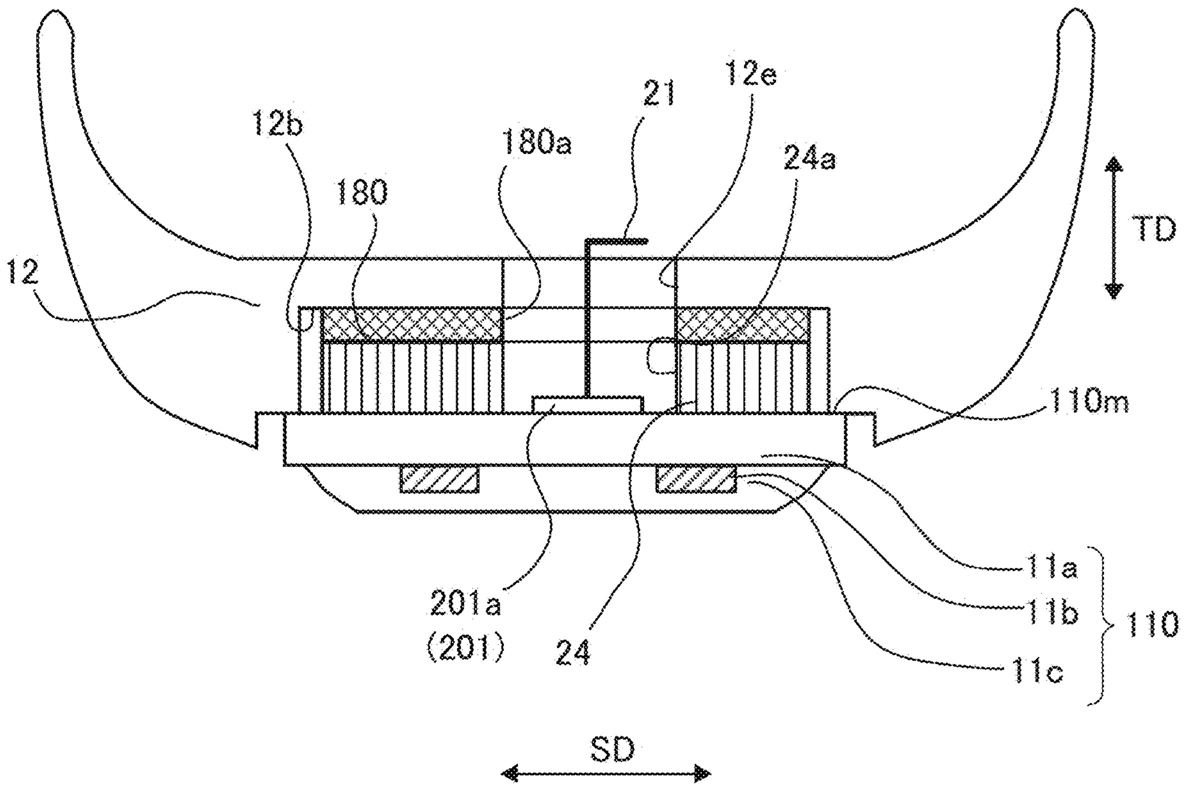
FIG. 13 is a cross-sectional view illustrating a cross section taken along line 13A-13A of FIG. 12.

Next, peripheral configurations and operations of the thermistor 200 and the printed wire 201 will be described with reference to FIGS. 11, 12, and 13. FIG. 12 is a front view illustrating the back surface 110*m* of the heater 110 in a state where the heat conducting member 180 is disposed on the heater 110. FIG. 13 is a cross-sectional view illustrating a cross section taken along line 13A-13A of FIG. 12. In FIG. 13, the heater 110 and the heat conducting member 180 are disposed on the heater holder 12.

The lead wire 21 is bonded to the connecting portion 201*a* on the printed wire 201 by means of welding, pressure contact, brazing, ultrasonic bonding, or the like, and the lead wire 21 is connected to the control unit 32 (see FIG. 1). The control unit 32 energizes the resistive heating element 11*b* with an AC current so that the heater 110 has a desired temperature.

The length (longitudinal length) and the width (short-side length) of the heat conducting member 180 are set to be the same as those of the heat conducting member 18 according to the first embodiment. In addition, a hole 180*a* is provided around the lead wire 21 and the connecting portion 201*a* so as to secure an insulation distance of the heat conducting member 180 with respect to the lead wire 21 and the connecting portion 201*a*. That is, the insulating layer 24 and the heat conducting member 180 have respective holes 24*a* and 180*a* as openings through which the lead wire 21 as a conductive wire is wired. The heater holder 12 also has a hole 12*e* that is continuous with the hole 180*a*, so that the lead wire 21 can be wired to an upper portion of the heater holder 12.

Note that the size of the hole 180*a* of the heat conducting member 180 is preferably as small as possible if an insulation distance is secure, in order to enhance as much as possible the temperature leveling-out effect between a sheet passing portion, which is a region through which the sheet P passes, and a sheet non-passing portion, which is a region through which the sheet P does not pass, of the heater 110. In the present embodiment, the insulating layer 24 is provided in the same range as the heat conducting member 180 in the longitudinal direction LD and in the short direction SD, such that there is no space between the heater 110 and the heat conducting member 180. However, in a range where the thermistor 200 and the printed wire 201 are not present, the insulating layer 24 may not be provided because there is no risk of short circuit or leakage. In this case, it is preferable to devise a shape to increase the thickness of the heat conducting member 180 or the like, so that there is no space between the heater 110 and the heat conducting member 180.

As described above, in the present embodiment, by using the heater 110 with the thermistor 200 being directly disposed on the substrate 11*a* of the heater 110, it is possible to save space as compared with the configuration of the thermistor according to the first embodiment, and it is also possible to accurately measure a temperature of the heater 110. In addition, by providing the insulating layer 24 and the heat conducting member 180 between the heater 110 and the heater holder 12, it is possible to level out the temperature difference in the sheet non-passage area while suppressing a leakage and a short circuit.

First Modification of Second Embodiment

Next, a first modification of the second embodiment will be described. In the first modification of the second embodiment, a hole 180*b* for the thermistor 200 is formed in addition to the hole 180*a* in the heat conducting member 180 according to the second embodiment. Therefore, a configuration thereof similar to that of the second embodiment will not be illustrated or will be described with the same reference signs being given in the drawings.

Figure 14:
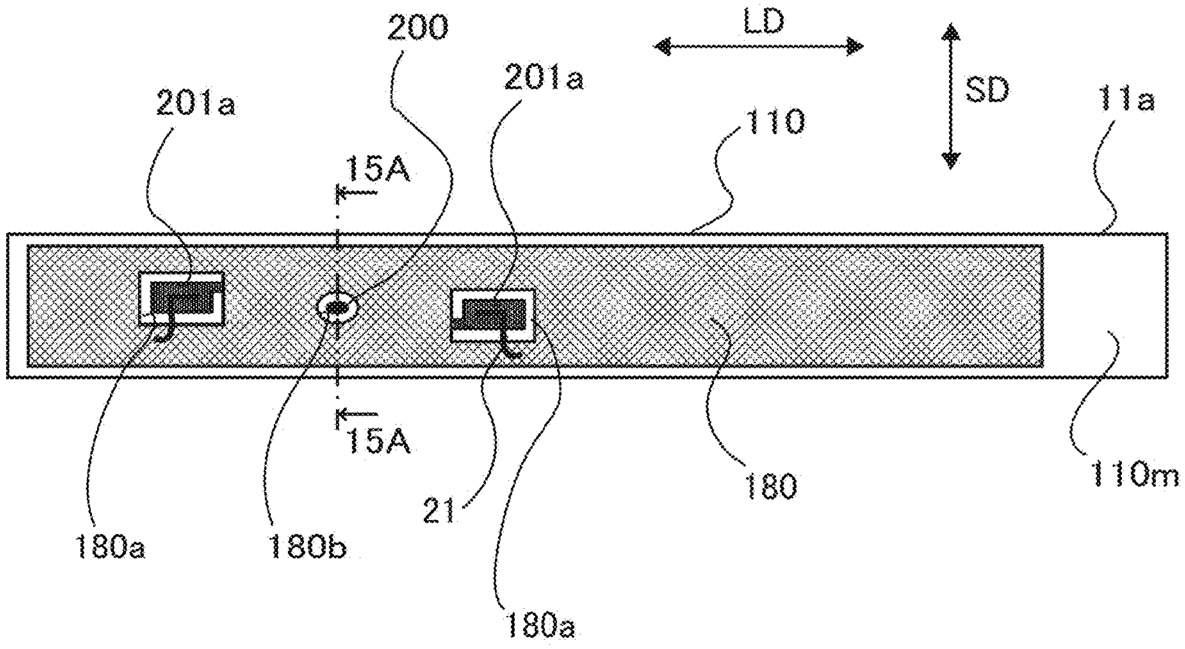
FIG. 14 is a front view illustrating a back surface of a heater according to a first modification of the second embodiment.
Figure 15:
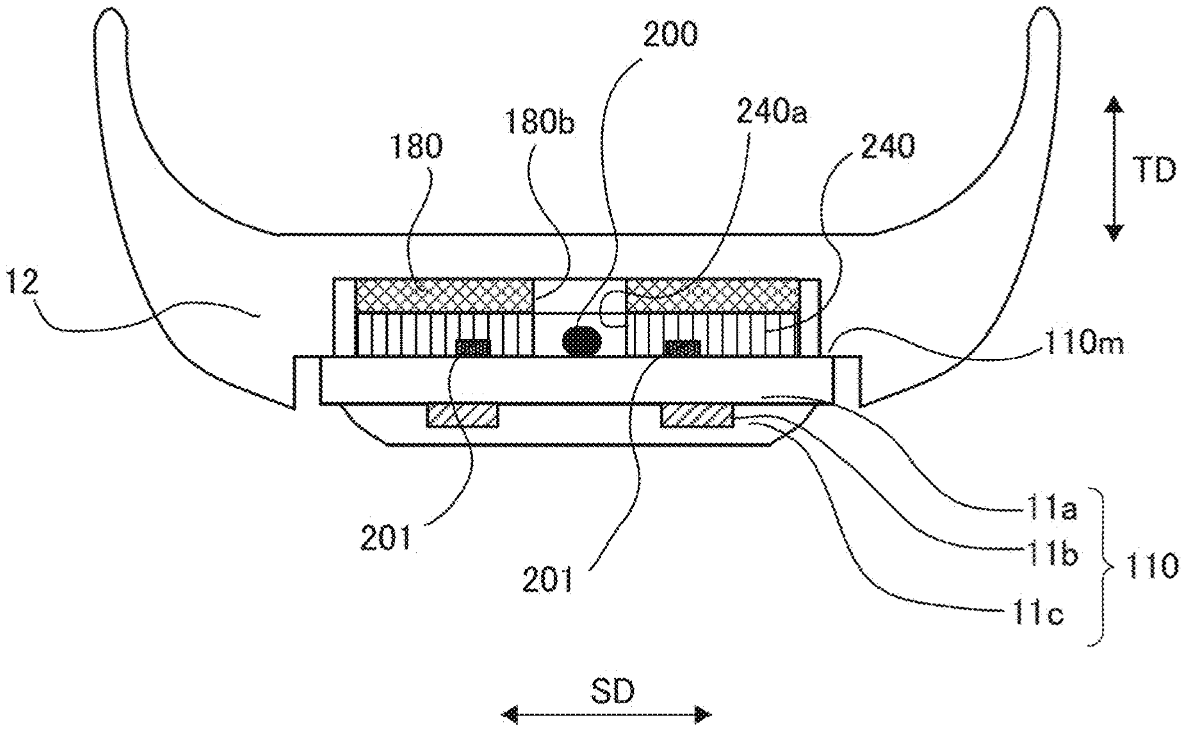
FIG. 15 is a cross-sectional view illustrating a cross section taken along line 15A-15A of FIG. 14.

FIG. 14 is a front view illustrating the back surface 110*m* of the heater 110 in a state where the heat conducting member 180 is disposed on the heater 110. FIG. 15 is a cross-sectional view illustrating a cross section taken along line 15A-15A of FIG. 14. In FIG. 15, the heater 110 and the heat conducting member 180 are disposed on the heater holder 12.

In the heat conducting member 180 according to the present modification, a hole 180*b* is formed around the thermistor 200 in addition to the hole 180*a* around the connecting portion 201*a* described in the second embodiment. That is, the heat conducting member 180 has a hole 180*b* as an opening at a position corresponding to the thermistor 200. This is to secure an insulation distance between the thermistor 200 and the heat conducting member 180. As a result, there is no need to provide the insulating layer 240 on the thermistor 200, making it possible to reduce the thickness of the insulating layer 240 as compared with that in the second embodiment. In other words, the insulating layer 240 has an opening 240*a* at a position corresponding to the thermistor 200.

In the present modification, the insulating layer 240 is not provided around the thermistor 200 in the same range as the hole 180*b*, but it does not matter whether the range in which the insulating layer 240 is not provided around the thermistor 200 is large or small as long as the insulation distance is not affected. In addition, since the insulating layer 240 can be thinner than that in the second embodiment, the insulating layer 240 may be in the form of a sheet mainly made of polyimide, perfluoroalkoxy fluorine resin (PFA), polytetrafluoroethylene resin (PTFE), tetrafluoroethylene-hexafluoropropylene resin (FEP), or the like.

Furthermore, in the second embodiment, the insulating layer 24 is integrally formed with the heater 110. However, in the present modification, the insulating layer 24 may be integrally formed with the heat conducting member 180, or the insulating layer 24 may be simply sandwiched between the heat conducting member 180 and the heater 110. In the present modification, similarly to the second embodiment, the insulating layer 240 is provided in the same range as the heat conducting member 18, other than the periphery of the thermistor 200, but the insulating layer 240 is not limited thereto. For example, in a range where the printed wire 201 is not present, the insulating layer 240 may not be provided because there is no risk of short circuit or leakage.

Second Modification of Second Embodiment

Next, a second modification of the second embodiment will be described. In the second modification of the second embodiment, a throttle-like shape is added to the heater holder 12 and the heat conducting member 180 according to the second embodiment by retracting from the thermistor 200. Therefore, a configuration thereof similar to that of the second embodiment will not be illustrated or will be described with the same reference signs being given in the drawings.

Figure 16:
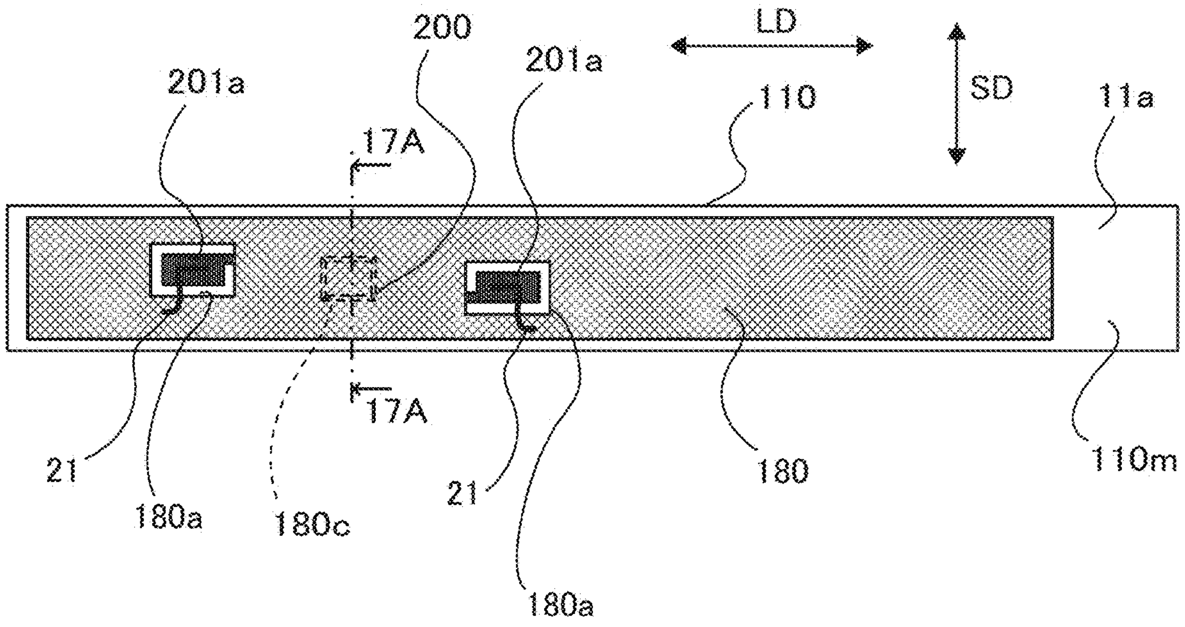
FIG. 16 is a front view illustrating a back surface of a heater according to a second modification of the second embodiment.
Figure 17:
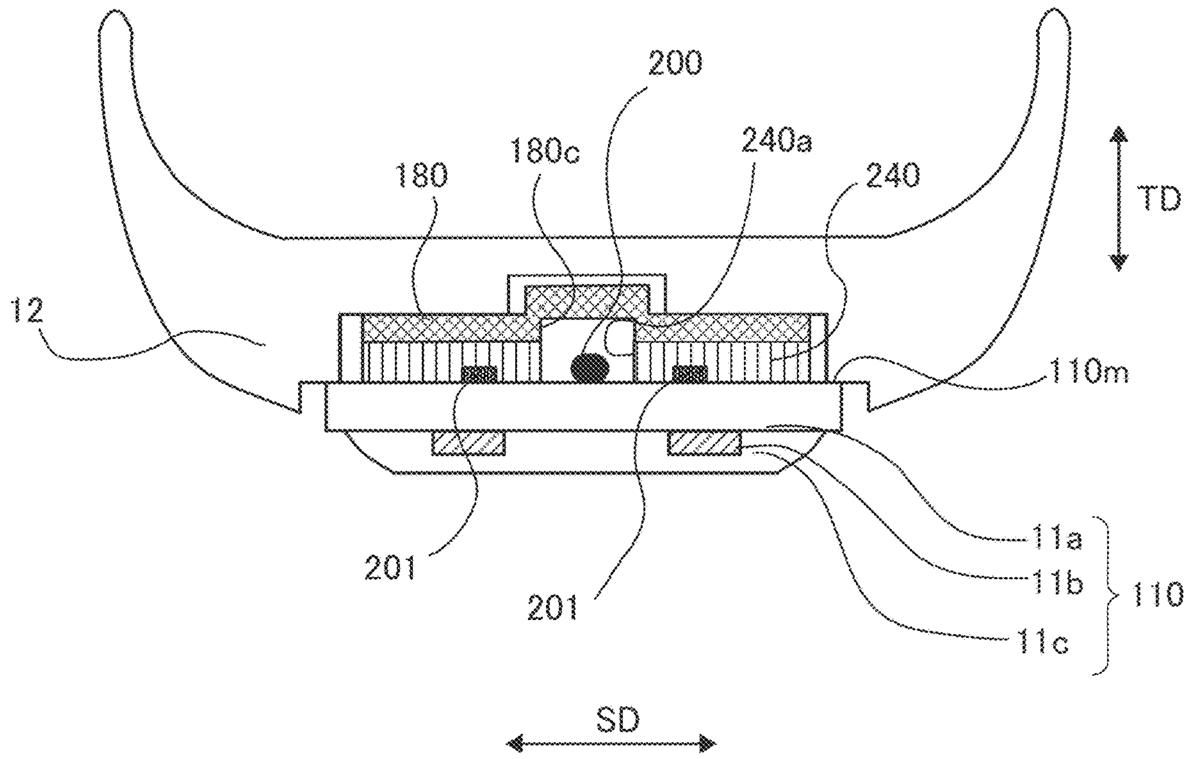
FIG. 17 is a cross-sectional view illustrating a cross section taken along line 17A-17A of FIG. 16.

FIG. 16 is a front view illustrating the back surface 110*m* of the heater 110 in a state where the heat conducting member 180 is disposed on the heater 110. FIG. 17 is a cross-sectional view illustrating a cross section taken along line 17A-17A of FIG. 16. In FIG. 17, the heater 110 and the heat conducting member 180 are disposed on the heater holder 12.

In the heat conducting member 180 according to the present modification, a throttle-like shape 180*c* is formed around the thermistor 200 in addition to the hole 180*a* around the connecting portion 201*a* described in the second embodiment. That is, the heat conducting member 180 has a throttle-like shape 180*c* serving as a recess recessed in a direction away from the thermistor 200 at a position corresponding to the thermistor 200. This is to secure an insulation distance between the thermistor 200 and the heat conducting member 180. As a result, there is no need to provide the insulating layer 240 on the thermistor 200, making it possible to reduce the thickness of the insulating layer 240 as compared with that in the second embodiment.

Furthermore, since the hole 180*b* is not provided in the heat conducting member 180 as in the first modification of the second embodiment, it is possible to suppress blocking of heat transfer on the heat conducting member 180, and it is possible to further enhance the temperature leveling-out effect between the sheet passing portion and the sheet non-passing portion as compared with that in the first modification of the second embodiment. In the present modification, the insulating layer 240 is not provided around the thermistor 200 in the same range as the throttle-like shape 180*c*, but it does not matter whether the range in which the insulating layer 240 is not provided around the thermistor 200 is large or small as long as the insulation distance is not affected. In addition, as in the first modification, the insulating layer 240 may be in the form of a sheet.

Needless to say, in the configuration described in the second embodiment (including the first and second modifications thereof) as well, a deviation of the heat conducting member 18 in the longitudinal direction LD can be reduced by providing the protrusions 11*d* and 11*e* described in the first embodiment on the back surface of the heater.

Third Embodiment

Next, a third embodiment of the present invention will be described. In the third embodiment, a hole for allowing the lead wire 21 to pass through the heater holder 12 is formed without performing processing for forming a hole or a throttle in the insulating layer of the heater 110 or the heat conducting member 180 as in the second embodiment. Therefore, a configuration thereof similar to that of the second embodiment will not be illustrated or will be described with the same reference signs being given in the drawings.

Figure 18A:
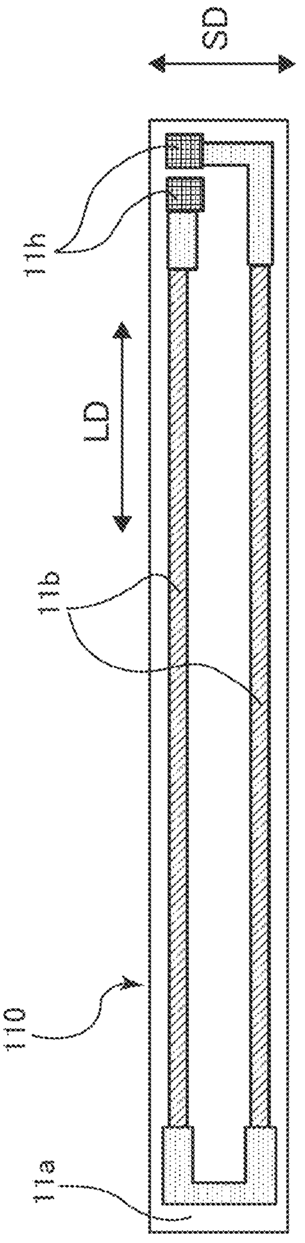
FIG. 18A is a front view illustrating a front surface of a heater according to a third embodiment.
Figure 18B:
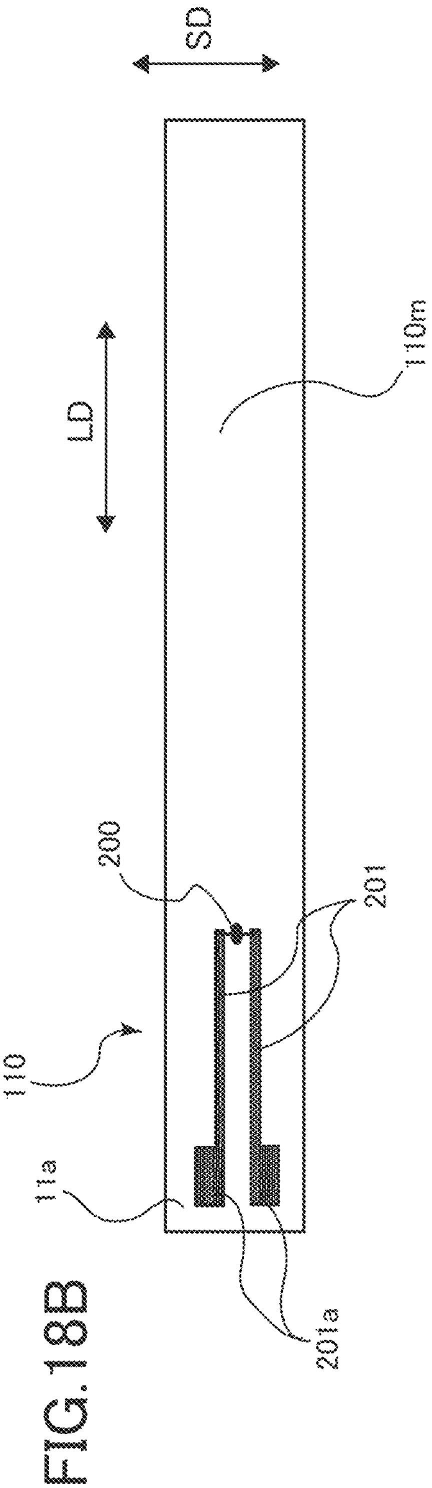
FIG. 18B is a front view illustrating a back surface of the heater.

FIG. 18A is a front view illustrating a front surface of the heater 110 according to the present embodiment, and FIG. 18B is a front view illustrating a back surface of the heater 110. The front surface of the heater 110 has the same configuration as that of FIG. 10A described in the second embodiment.

As illustrated in FIG. 18B, on the back surface of heater 110, a thermistor 200 that detects a temperature of the heater 110 and a printed wire 201 for controlling the thermistor are directly provided on the substrate 11*a* in an adhesive and printed manner. The lead wire 21 (see FIGS. 19 and 20) is bonded to the connecting portion 201*a* on the printed wire 201 by means of welding, pressure contact, brazing, ultrasonic bonding, or the like, and the lead wire 21 is connected to the control unit 32 (see FIG. 1).

In the present embodiment, the connecting portion 201*a* of the printed wire 201 is provided outside the resistive heating element 11*b* provided on the front surface of the heater 110 in the longitudinal direction LD. That is, the connecting portion 201*a* and the resistive heating element 11*b* are disposed so as not to overlap each other in the thickness direction TD (see FIG. 20). In the present embodiment, as illustrated in FIGS. 18A and 18B, the contact 11*h* is provided on one end side (a right side) in the longitudinal direction LD of the heater 110, and the connecting portion 201*a* is provided on the other end side (a left side) in the longitudinal direction LD of the heater 110. That is, the connecting portion 201*a* is disposed on the side opposite to the contact 11*h* across the heat conducting member 18 in the longitudinal direction LD. As a result, a wire connected to the contact 11*h* and a wire connected to the connecting portion 201*a* do not interfere with each other. The contact 11*h* and the connecting portion 201*a* may be collectively disposed on one end side or the other end side of the heater 110 as long as a wiring space can be secured.

Figure 19:
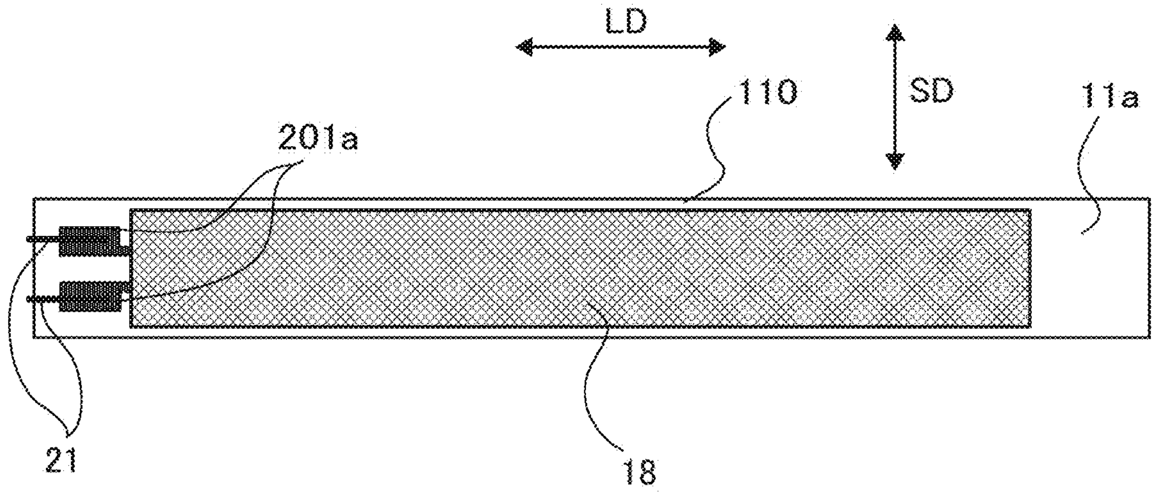
FIG. 19 is a front view illustrating the back surface of the heater in a state where a heat conducting member is disposed on the heater.
Figure 20:
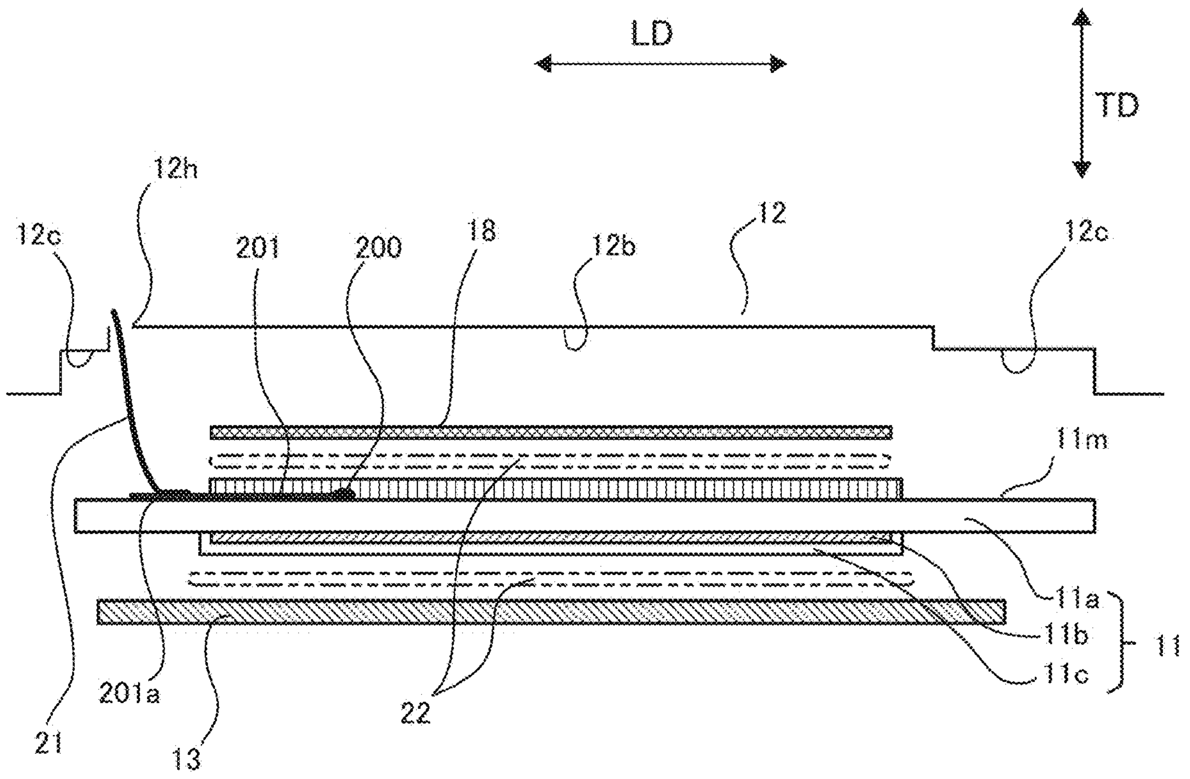
FIG. 20 is a cross-sectional view illustrating a cross section parallel to the longitudinal direction of a peripheral configuration of the heater.

As illustrated in FIGS. 19 and 20, the lead wire 21 connected to the connecting portion 201*a* of the printed wire 201 is connected to the control unit 32 (see FIG. 1) through a hole 12*h* provided in the first seating surface 12*b* of the heater holder 12. Similarly to the connecting portion 201*a*, the hole 12*h* is disposed outside the resistive heating element 11*b* and the heat conducting member 18 in the longitudinal direction LD. The hole 12*h* is disposed on the same side as the connecting portion 201*a* with respect to the heat conducting member 18 in the longitudinal direction LD.

An insulating layer 24 is disposed between the heat conducting member 18 and the back surface 11*m* of the heater 110, and the insulating layer 24 is integrally provided on the back surface of the heater 110 so as to cover the thermistor 200 and the printed wire 201. As a result, the thermistor 200 and the printed wire 201 are prevented from directly abutting on the heat conducting member 18 and causing a short circuit, a leakage, or the like. In the present embodiment, the connecting portion 201*a* of the printed wire 201 is disposed outside the insulating layer 24 and the heat conducting member 18 in the longitudinal direction LD.

In the present embodiment, the insulating layer 24 is provided in the same range as the heat conducting member 18 in the longitudinal direction LD and in the short direction SD, such that there is no space between the heater 110 and the heat conducting member 18. However, in a range where the thermistor 200 and the printed wire 201 are not present, the insulating layer 24 may not be provided because there is no risk of short circuit or leakage. In this case, it is preferable to devise a shape to increase the thickness of the heat conducting member 18 or the like, so that there is no space between the heater 110 and the heat conducting member 18.

As described above, in the present embodiment, the connecting portion 201*a* of the printed wire 201, the lead wire 21 connected to the connecting portion 201*a*, and the hole 12*h* of the heater holder 12 are disposed outside the resistive heating element 11*b*, the insulating layer 24, and the heat conducting member 18 in the longitudinal direction LD. As a result, there is no need to perform processing for forming a hole or the like for allowing the lead wire 21 to pass through the heat conducting member 18 or the first seating surface 12*b* of the heater holder 12 in a heat generating region of the resistive heating element 11*b*, making it possible to improve the temperature leveling-out effect of the heat conducting member 18 in the heat generating region of the heater 110. In addition, since the heat conducting member 18 and the heater holder 12 do not need to be processed, the cost can be reduced, and the possibility of deformation or damage occurring when the heat conducting member 18 thermally expands due to the influence of residual stress caused by the processing can be reduced.

First Modification of Third Embodiment

Next, a first modification of the third embodiment of the present invention will be described. In the first modification of the third embodiment, a plurality of thermistors and printed wires are provided on the back surface of the heater 110. Therefore, a configuration thereof similar to that of the third embodiment will not be illustrated or will be described with the same reference signs being given in the drawings.

Figure 21:
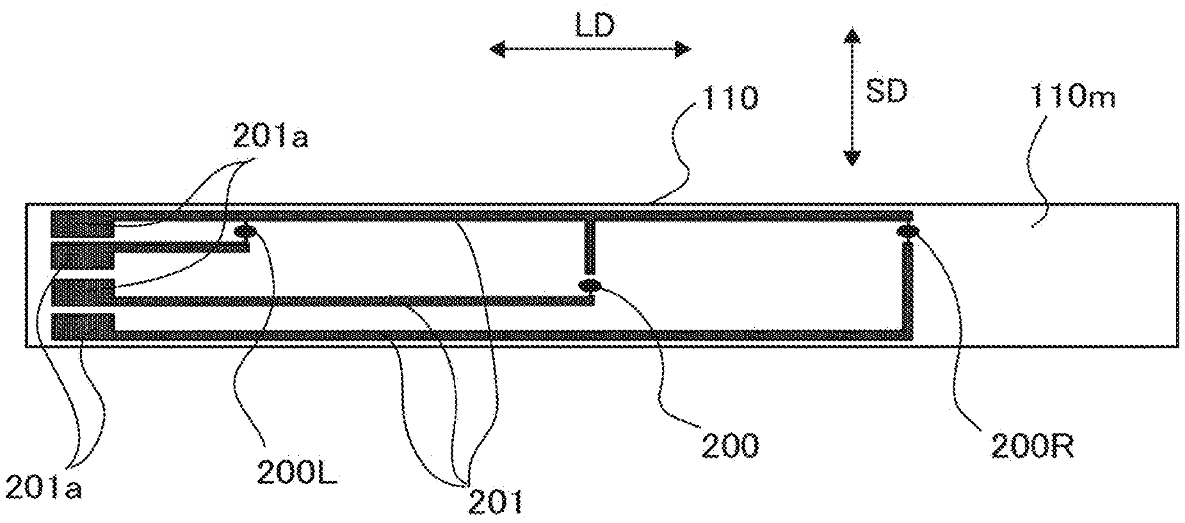
FIG. 21 is a front view illustrating a back surface of a heater according to a first modification of the third embodiment.
Figure 22:
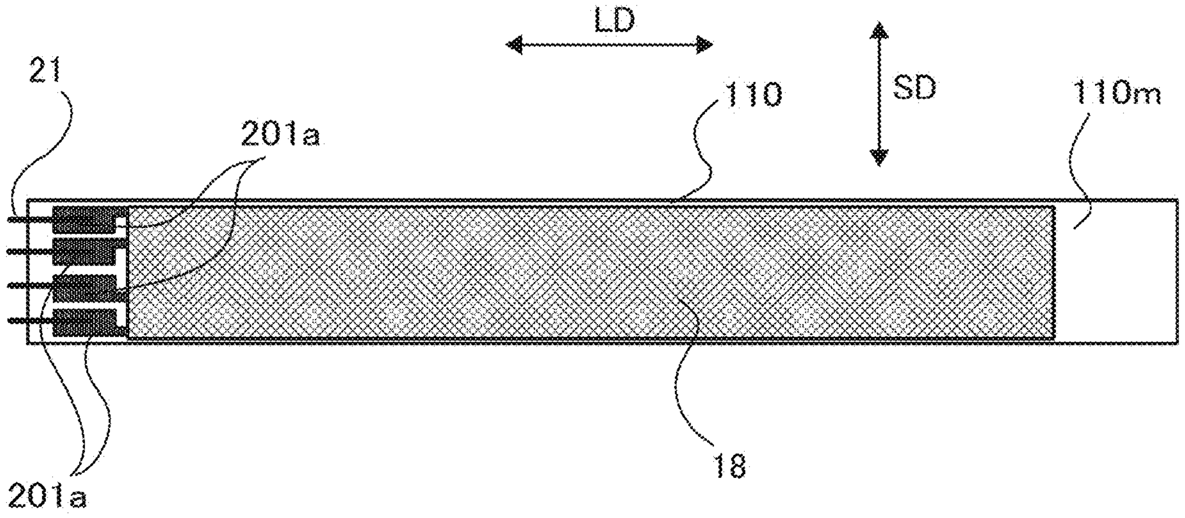
FIG. 22 is a front view illustrating the back surface of the heater in a state where the heat conducting member is disposed on the heater.

FIG. 21 is a front view illustrating the back surface 110*m* of the heater 110 according to the present modification, and FIG. 22 is a front view illustrating the back surface 110*m* of the heater 110 in a state where the heat conducting member 18 is disposed on the heater 110. As illustrated in FIG. 21, in the present modification, a plurality of (three in the present modification) thermistors 200, 200L, and 200R are provided on the back surface 110*m* of the heater 110.

The fixing unit 6 (see FIG. 2) according to the present modification is a so-called center-based fixing unit in which the conveyance reference position of the sheet P is the center of the fixing unit 6 in the longitudinal direction LD. The thermistor 200 is disposed at a central portion in the longitudinal direction LD of the fixing unit 6, that is, at a central portion in the longitudinal direction LD of the fixing nip NF, so as to overlap a region through which the sheet P passes, regardless of the size of the sheet P.

On the other hand, the thermistors 200L and 200R are disposed at positions away by 99 mm from the conveyance reference position of the sheet P, that is, the center of the fixing nip NF in the longitudinal direction LD, on the left and right sides, respectively, so as to overlap the sheet non-passage range when A5 paper is printed.

The control unit 32 (see FIG. 1) energizes the resistive heating element 11*b* based on a temperature detected by the thermistor 200 so that the heater 110 has a desired temperature. The thermistors 200L and 200R have a role of monitoring a temperature of the sheet non-passage region when narrow paper such as A5 paper is printed. When the temperature of any of the thermistors 200L and 200R becomes higher than or equal to a predetermined temperature, the control unit 32 performs control to stop the printing or to increase an interval at which the sheets P are fed.

As in the example illustrated in FIG. 20, the heat conducting member 18 has the same longitudinal length as the resistive heating element 11*b*. The connecting portion 201*a* of the printed wire 201 corresponding to each of the thermistors 200, 200L, and 200R is disposed outside the resistive heating element 11*b* and the heat conducting member 18 in the longitudinal direction LD. Then, the lead wire 21 connected to each connecting portion 201*a* is connected to the control unit 32 (see FIG. 1) through the hole 12*h* provided in the first seating surface 12*b* of the heater holder 12, similarly to that in the third embodiment.

As described above, in the present modification, also in the configuration in which the plurality of thermistors 200, 200L, and 200R are disposed, the connecting portion 201*a*, the lead wire 21, and the hole 12*h* of the heater holder 12 are disposed outside the resistive heating element 11*b* and the heat conducting member 18 in the longitudinal direction LD. As a result, there is no need to perform processing for forming a hole or the like for allowing the lead wire 21 to pass through the heat conducting member 18 or the first seating surface 12*b* of the heater holder 12 in a heat generating region of the resistive heating element 11*b*, making it possible to improve the temperature leveling-out effect of the heat conducting member 18 in the heat generating region of the heater 110. This effect is greater in the configuration in which a plurality of thermistors and a plurality of lead wires for the respective thermistors are provided.

In the present modification, all the connecting portions 201*a* corresponding to the thermistors 200, 200L, and 200R, respectively, are disposed on the other end side (the left side) in the longitudinal direction LD of the heater 110, but the connecting portions 201*a* are not limited thereto. For example, the plurality of connecting portions 201*a* may be arranged in a distributed manner on one end side (the right side) and the other end side (the left side) in the longitudinal direction LD of the heater 110.

Second Modification of Third Embodiment

Next, a second modification of the third embodiment of the present invention will be described. In the second modification of the third embodiment, the longitudinal length of the heat conducting member 18 is shorter than that in the first modification of the third embodiment. Therefore, a configuration thereof similar to that of the first embodiment of the third embodiment will not be illustrated or will be described with the same reference signs being given in the drawings.

Figure 23:
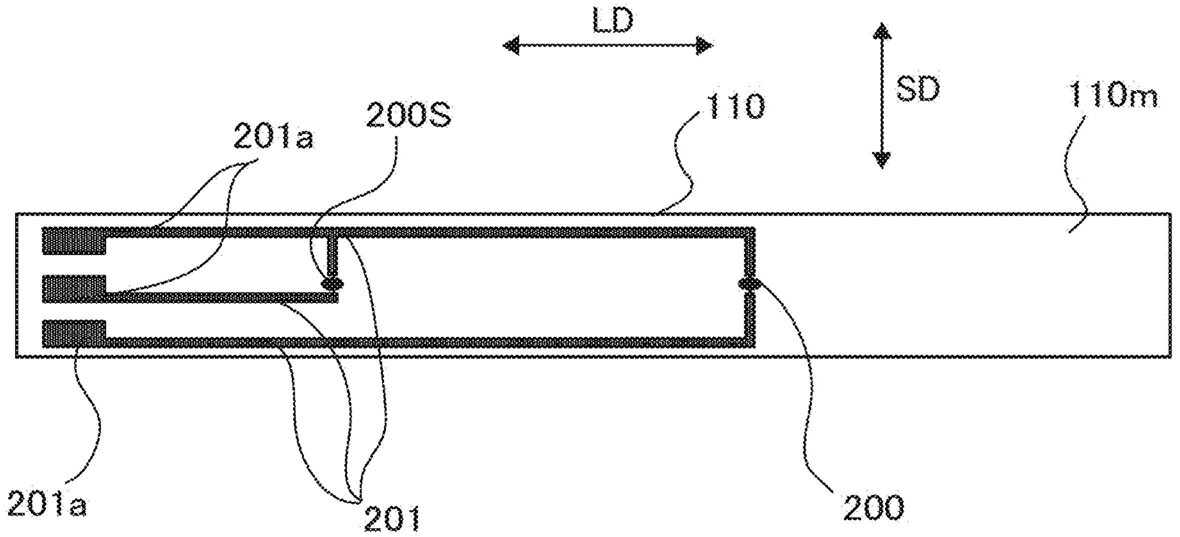
FIG. 23 is a front view illustrating a back surface of a heater according to a second modification of the third embodiment.
Figure 24:
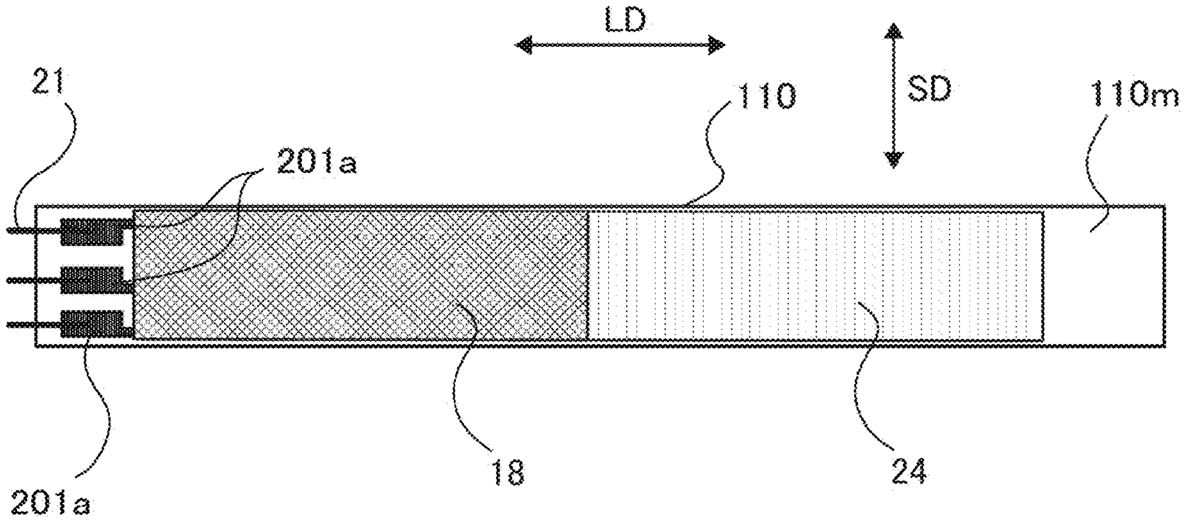
FIG. 24 is a front view illustrating the back surface of the heater in a state where a heat conducting member is disposed on the heater.
Figure 25:
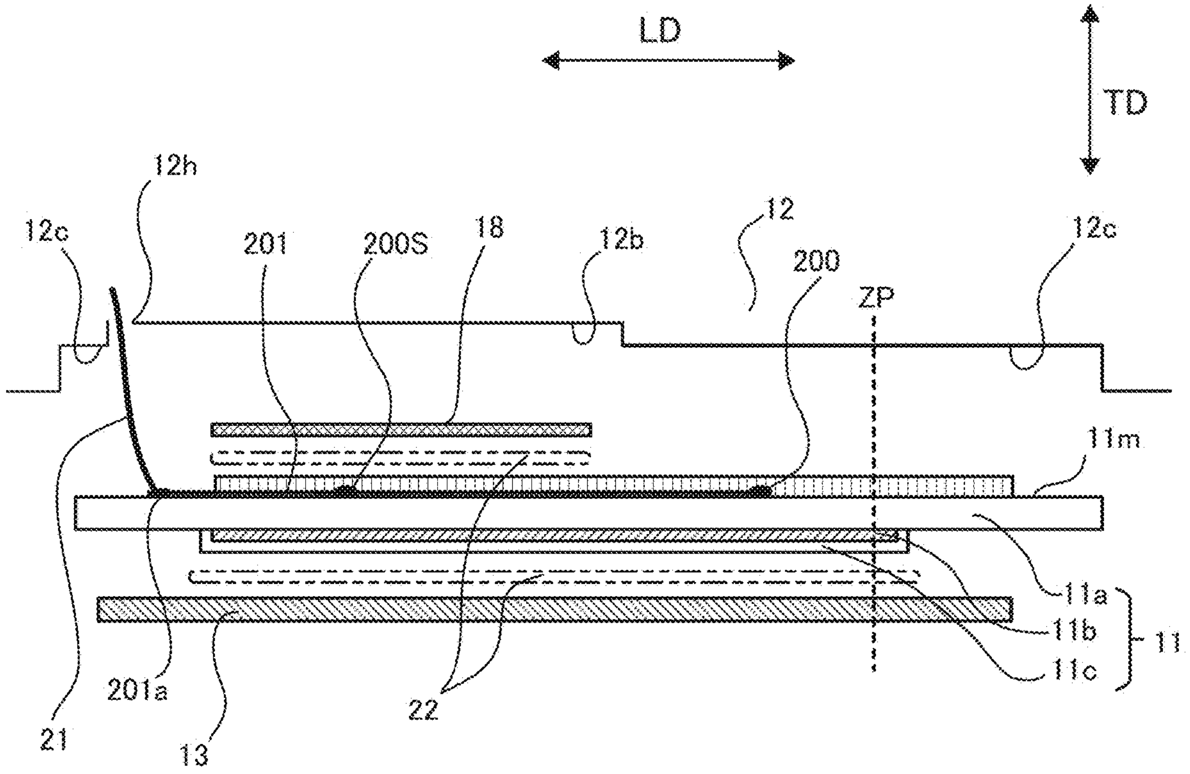
FIG. 25 is a cross-sectional view illustrating a cross section parallel to the longitudinal direction of a peripheral configuration of the heater.

In the present second modification, regardless of the size of the sheet, the sheet P is conveyed in a state where one side (one end in the width direction) of the sheet P coincides with the reference position ZP, that is, conveyed on a so-called one-side basis. FIG. 23 is a front view illustrating the back surface 110*m* of the heater 110 according to the present modification, and FIG. 24 is a front view illustrating the back surface 110*m* of the heater 110 in a state where the heat conducting member 18 and the insulating layer 24 are disposed on the heater 110. FIG. 25 is a side view illustrating a peripheral configuration of the heater 110. FIG. 25 is a cross-sectional view illustrating a cross section perpendicular to the short direction SD, that is, a cross section extending in the longitudinal direction LD and the thickness direction TD.

In the present modification, one end (one side) of the sheet P in the width direction parallel to the longitudinal direction LD is conveyed with reference to the reference position ZP illustrated in FIG. 25. That is, the sheet P is conveyed in a state where one side (one end in the width direction) of the sheet P coincides with the reference position ZP regardless of the size of the sheet. For example, the sheet P is conveyed while one side thereof is in rubbing contact with a reference surface provided in a conveyance guide (not illustrated), so that the sheet P is conveyed along the reference position ZP on a one-side basis.

As illustrated in FIG. 23, in the present modification, a plurality of (two in the present modification) thermistors 200 and 200S are provided on the back surface 110*m* of the heater 110. The thermistor 200 is disposed at a position overlapping a region through which sheets of all sizes that can be used by the fixing unit 6 pass, and the control unit 32 (see FIG. 1) energizes the resistive heating element 11*b* with an AC current, so that the temperature of the thermistor 200 becomes a desired temperature.

On the other hand, the thermistor 200S is disposed at a position away by 198 mm from the reference position ZP of the sheet P in the longitudinal direction LD on the left side so as to overlap the sheet non-passage range when A5 paper is printed. The thermistor 200S has a role of monitoring a temperature of the sheet non-passage region when narrow paper such as A5 paper is printed. When the temperature of the thermistor 200S becomes higher than or equal to a predetermined temperature, the control unit 32 performs control to stop the printing or to increase an interval at which the sheets P are fed.

In the present modification, the sheet non-passage range in the fixing nip NF when a sheet P having a narrow width is conveyed is only the left side in FIGS. 23 to 25, and the heat conducting member 18 is disposed to correspond to such a sheet non-passage range, thereby making it possible to configure the heat conducting member 18 to be short. The connecting portions 201*a* of the printed wires 201 for feeding power to the respective thermistors 200 and 200S are disposed outside the resistive heating element 11*b* and the heat conducting member 18 in the longitudinal direction LD. Each lead wire 21 is bonded to each connecting portion 201*a* by means of welding, pressure contact, brazing, ultrasonic bonding, or the like, and the lead wire 21 is connected to the control unit 32 (see FIG. 1). The lead wire 21 is connected to the control unit 32 (see FIG. 1) through the hole 12*h* provided in the first seating surface 12*b* of the heater holder 12. Similarly to the connecting portion 201*a*, the hole 12*h* is disposed outside the resistive heating element 11*b* and the heat conducting member 18 in the longitudinal direction LD.

As a result, there is no need to perform processing for forming a hole or the like for allowing the lead wire 21 to pass through the heat conducting member 18 or the first seating surface 12*b* of the heater holder 12 in a heat generating region of the resistive heating element 11*b*, making it possible to improve the temperature leveling-out effect of the heat conducting member 18 in the heat generating region of the heater 110.

In the present modification, the insulating layer 24 is also provided in a range where the heat conducting member 18 is not present in the longitudinal direction LD and in the short direction SD. However, in a range where the heat conducting member 18 is not present, the insulating layer 24 may not be provided because there is no risk of short circuit or leakage. In this case, it is preferable to devise a shape of the second seating surface 12*c* of the heater holder 12 so that the thermistor 200 and the printed wire 201 do not interfere with the heater holder 12.

As described above, in the present modification, also in the fixing unit 6 that conveys the sheet P on a one-side basis, the connecting portion 201*a* and the hole 12*h* are provided outside the heat conducting member 18 in the longitudinal direction LD. As a result, there is no need to perform processing for forming a hole or the like for allowing the lead wire 21 to pass through the heat conducting member 18 or the first seating surface 12*b* of the heater holder 12, making it possible to improve the temperature leveling-out effect of the heat conducting member 18 in the heat generating region of the heater 110.

Needless to say, in the configuration described in the third embodiment (including the first and second modifications thereof) as well, a deviation of the heat conducting member 18 in the longitudinal direction LD can be reduced by providing the protrusions 11*d* and 11*e* described in the first embodiment on the back surface 11*m* of the heater 11.

Fourth Embodiment

Next, the fourth embodiment of the present invention will be described. In the fourth embodiment, a bonding portion 12*f* is provided in the heater holder 12 according to the first embodiment. Therefore, a configuration thereof similar to that of the first embodiment will not be illustrated or will be described with the same reference signs being given in the drawings.

Conventionally, in order to easily dispose of a jammed sheet, there has been known a configuration in which a pressure of a load applied to the fixing film unit 19 is temporarily reduced. If the pressure on the fixing film unit 19 is reduced in the configuration according to the first embodiment, the heater 11 may rise up from the heater holder 12. As a result, there is a possibility that the heat conducting member 18 may get between the protrusions 11*e* and 11*d* or the protrusions 11*f* and 11*g* (see FIG. 9A) and the first seating surface 12*b* of the heater holder 12. In addition, when the pressure on the fixing film unit 19 is reduced in the configuration according to the third embodiment, if the heater 11 rises up from the heater holder 12, the position of the connecting portion 201*a* moves, and accordingly, there is a possibility that a load may be applied to the lead wire 21, and the lead wire 21 may come off the connecting portion 201*a*.

In order to cope with such a problem, for example, a configuration in which the heater 11 is bonded to the heater holder 12 using a heat-resistant adhesive is effective. If the heater 11 is bonded to the heater holder 12, the heater 11 does not rise up from the heater holder 12, suppressing an occurrence of the phenomenon as described above.

Figure 26:
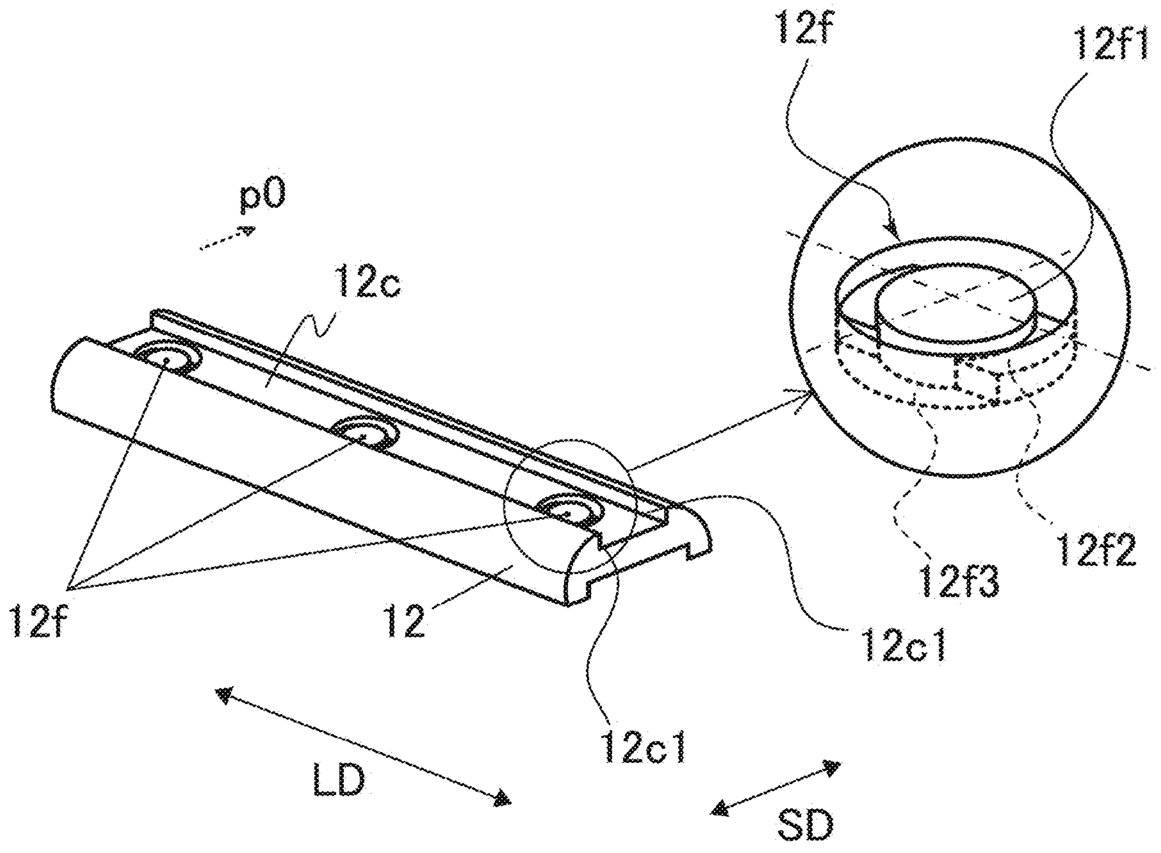
FIG. 26 is a perspective view illustrating a heater holder according to a fourth embodiment.

The fourth embodiment of the present invention will be described as an example of a configuration in which the heater 11 is bonded to the heater holder 12 using a heat-resistant adhesive. FIG. 26 is a perspective view illustrating the heater holder 12 according to the present embodiment, and is a perspective view illustrating the vicinity of the region CP of FIG. 8.

As illustrated in FIG. 26, the heater holder 12 according to the present embodiment has a plurality of bonding portions 12*f* on the second seating surface 12*c*. The heater 11 abuts on the second seating surface 12*c* serving as an abutment surface. The plurality of bonding portions 12*f* are arranged side by side in the longitudinal direction LD, and a heat-resistant adhesive is applied to the bonding portions 12*f* to bond the back surface 11*m* (see FIG. 8) of the heater 11 to the second seating surface 12*c* of the heater holder 12.

As the heat-resistant adhesive, a material that is inexpensive and can be easily applied while having heat resistance, for example, a moisture-curable silicone rubber or a thermosetting silicone rubber is used. By bonding the back surface 11*m* of the heater 11 to the second seating surface 12*c* of the heater holder 12 using a silicone rubber having elasticity even after the heat-resistant adhesive is cured, even when the temperature repeatedly rises and drops and the heater 11 and the heater holder 12 are deformed due to thermal expansion, a bonding surface can follow the deformation, thereby preventing the adhesive from being peeled off. In the present embodiment, KE-3417 (manufactured by Shin-Etsu Silicone Co., Ltd.), which is a moisture-curable silicone rubber, was used as an example of the heat-resistant adhesive.

Figure 27A:
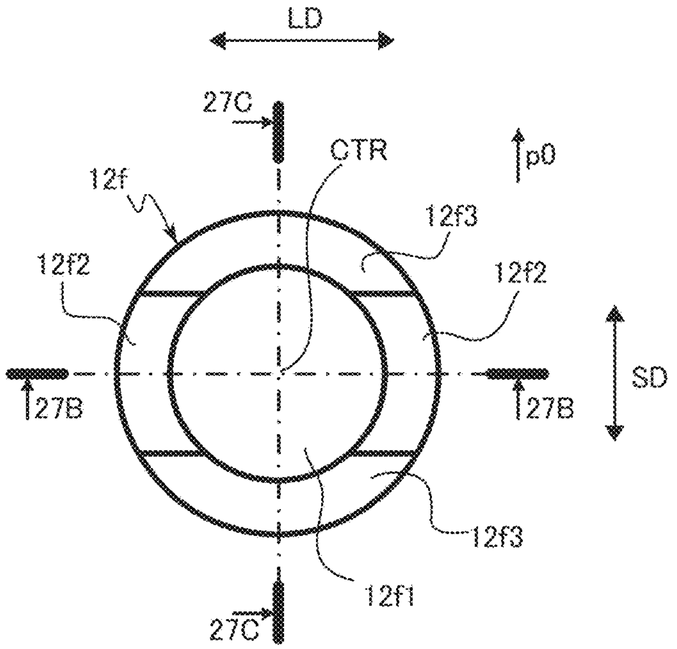
FIG. 27A is a plan view illustrating a bonding portion.
Figure 27B:
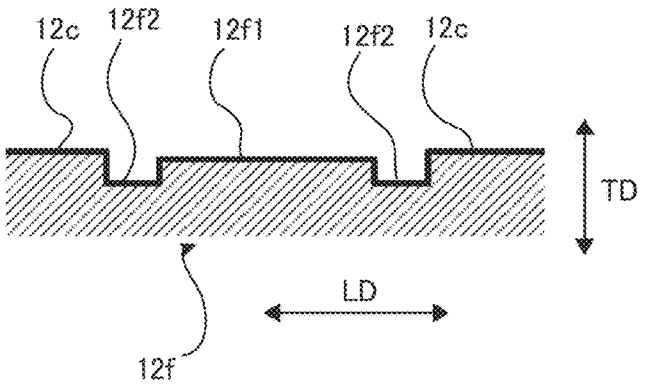
FIG. 27B is a cross-sectional view illustrating a cross section taken along line 27B-27B of FIG. 27A.
Figure 27C:
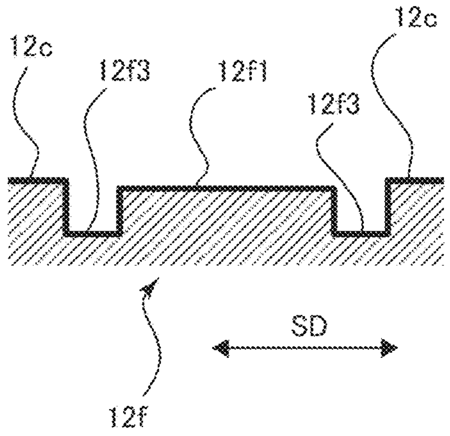
FIG. 27C is a cross-sectional view illustrating a cross section taken along line 27C-27C of FIG. 27A.

Next, a detailed shape of the bonding portion 12*f* will be described with reference to FIGS. 27A to 27C. Since the plurality of bonding portions 12*f* are formed in the same shape, only one bonding portion 12*f* will be described. FIG. 27A is a plan view illustrating a bonding portion 12*f*. FIG. 27B is a cross-sectional view illustrating a cross section taken along line 27B-27B of FIG. 27A, and FIG. 27C is a cross-sectional view illustrating a cross section taken along line 27C-27C of FIG. 27A. Note that FIG. 27B illustrates a cross section of the bonding portion 12*f* passing through the center CTR and extending in the longitudinal direction LD and in the thickness direction TD, and FIG. 27C illustrates a cross section of the bonding portion 12*f* passing through the center CTR and extending in the short direction SD and the thickness direction TD.

The bonding portion 12*f* has an adhesive application surface 12*f*1 serving as an application surface and grooves 12*f*2 and 12*f*3. The adhesive application surface 12*f*1 is a portion that is bonded to the heater 11 via the heat-resistant adhesive, and has a counterbore shape provided in the second seating surface 12*c*. In the present embodiment, the adhesive application surface 12*f*1 is a circular counterbore having a diameter of 4 mm and a depth of 0.15 mm. The adhesive application surface 12*f*1 may not be a counterbore but may be the same surface as the second seating surface 12*c*.

The grooves 12*f*2 and 12*f*3 are provided so as to surround the periphery of the adhesive application surface 12*f*1. In the present embodiment, the grooves 12*f*2 and 12*f*3 have a width of 1 mm, and the bonding portion 12*f* has a circular shape with an overall diameter of 6 mm. The groove 12*f*2 serving as a first groove is provided near the center of the second seating surface 12*c* in the short direction, and the groove 12*f*2 has a depth of 0.6 mm from the second seating surface 12*c*. The groove 12*f*3 serving as a second groove is provided on the end side in the short direction SD of the second seating surface 12*c* with respect to the groove 12*f*2. The groove 12*f*3 has a depth of 1.0 mm from the second seating surface 12*c*, and is deeper than the groove 12*f*2. In other words, the groove 12*f*3 is disposed at a position closer to one end 12*cl* as an end of the second seating surface 12*c* than the groove 12*f*2 in the short direction SD, and is formed deeper than the groove 12*f*2. It can also be said that the groove 12*f*3 has a larger volume than the groove 12*f*2.

Although the heat-resistant adhesive is applied onto the adhesive application surface 12*f*1 by a predetermined amount, the heat-resistant adhesive may overflow from the adhesive application surface 12*f*1 due to the process capability of the adhesive dispenser. If the overflowing heat-resistant adhesive overflows onto the second seating surface 12*c*, the heat-resistant adhesive may flow around from an end surface (a side surface in the short direction SD) of the substrate 11*a* of the heater 11 to the front surface of the heater 11, hindering a sliding rotation of the fixing film 13. In particular, if the heat-resistant adhesive overflows in the short direction SD of the heater 11, there is a high possibility that the heat-resistant adhesive may flow around onto the front surface of the heater 11 because the distance to the end surface of the substrate 11*a* is short.

In order to prevent the heat-resistant adhesive from flowing around onto the front surface of the heater 11 as described above, the grooves 12*f*2 and 12*f*3 are provided so as to surround the adhesive application surface 12*f*1 in the present embodiment. The heat-resistant adhesive that has overflowed from the adhesive application surface 12*f*1 falls into the grooves 12*f*2 and 12*f*3, making it difficult to overflow onto the second seating surface 12*c*.

The deeper the grooves 12*f*2 and 12*f*3, the larger the space created for the overflowing heat-resistant adhesive to be released, making it more difficult for the heat-resistant adhesive to overflow onto the second seating surface 12*c*. However, if the grooves 12*f*2 and 12*f*3 are too deep, the stiffness of the heater holder 12 decreases, and accordingly, it is not possible to maintain the stiffness required for the heater holder 12.

Therefore, in the present embodiment, concerning the groove 12*f*2 of which the distance to the end surface (the side surface in the longitudinal direction LD) of the substrate 11*a* is relatively long with a low possibility that the heat-resistant adhesive may flow around onto the front surface of the heater 11, the depth of the groove 12*f*2 is small to secure the stiffness of the heater holder 12. On the other hand, concerning the groove 12*f*3 of which the distance to the end surface (the side surface in the short direction SD) of the substrate 11*a* is relatively short with a high possibility that the heat-resistant adhesive may flow around onto the front surface of the heater 11, the depth of the groove 12*f*3 is deeper than the groove 12*f*2. As a result, while the heat-resistant adhesive is allowed to overflow from the bonding portion 12*f* in the longitudinal direction LD to some extent, the heat-resistant adhesive is prevented from overflowing from the bonding portion 12*f* in the short direction SD, and the heat-resistant adhesive is suppressed from flowing around onto the front surface of the heater 11.

As described above, by forming the groove 12*f*3 deeper than the groove 12*f*2, it is possible to suppress the heat-resistant adhesive from flowing around onto the front surface of the heater 11 while securing the stiffness of the heater holder 12.

First Modification of Fourth Embodiment

Next, a first modification of the fourth embodiment will be described. In the first modification of the fourth embodiment, the shape of the bonding portion 12*f* according to the fourth embodiment is changed. Therefore, a configuration thereof similar to that of the fourth embodiment will not be illustrated or will be described with the same reference signs being given in the drawings.

Figure 28A:
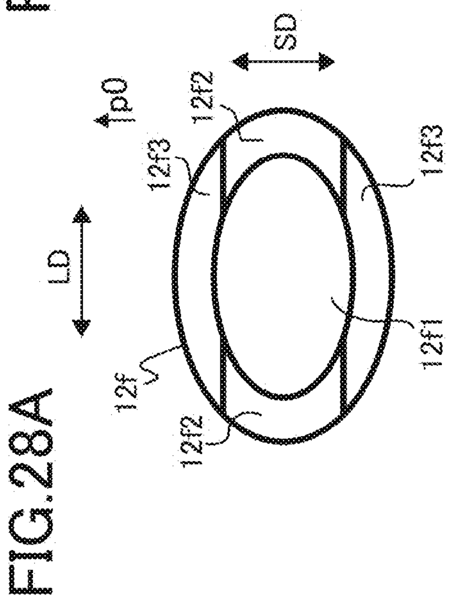
FIG. 28A is a plan view illustrating a bonding portion according to a first modification of the fourth embodiment.
Figure 28B:
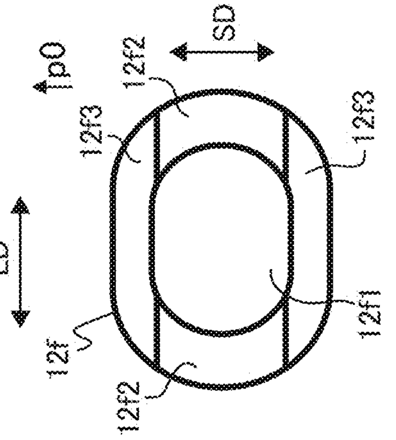
FIG. 28B is a plan view illustrating an oval bonding portion.
Figure 28C:
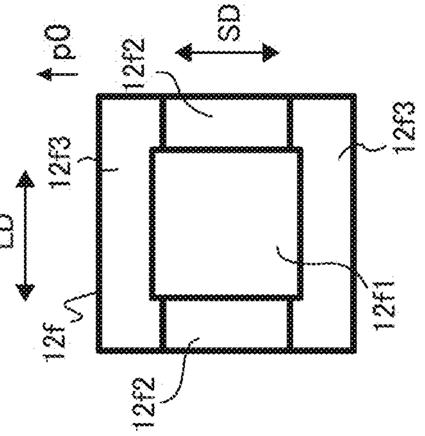
FIG. 28C is a plan view illustrating a square bonding portion.
Figure 28D:
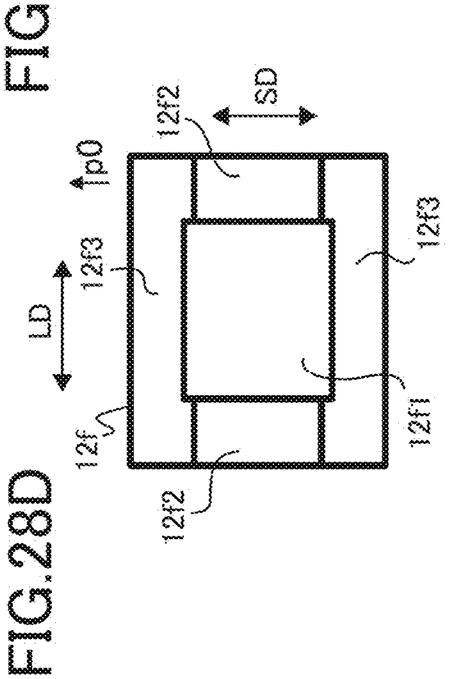
FIG. 28D is a plan view illustrating a rectangular bonding portion.
Figure 28E:
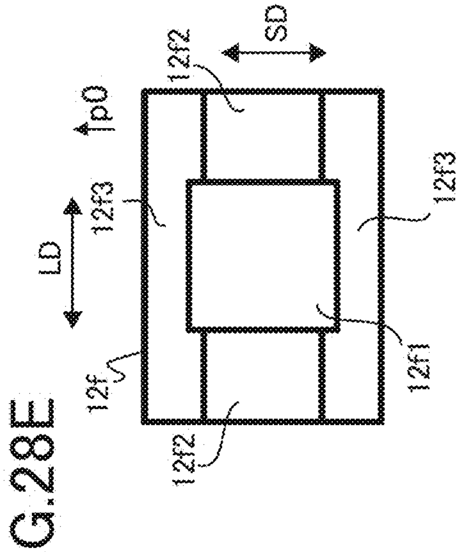
FIG. 28E is a plan view illustrating another rectangular bonding portion.

In the fourth embodiment, the entire bonding portion 12*f* is formed in a circular shape, but the bonding portion 12*f* is not limited thereto. FIG. 28A is a plan view illustrating an elliptical bonding portion 12*f*. FIG. 28B is a plan view illustrating an oval bonding portion 12*f*. FIG. 28C is a plan view illustrating a square bonding portion 12*f*. FIG. 28D is a plan view illustrating a rectangular bonding portion 12*f*. FIG. 28E is a plan view illustrating another rectangular bonding portion 12*f*.

As illustrated in FIGS. 28A to 28E, the bonding portion 12*f* may have an elliptical shape, an oval shape, a square shape, a rectangular shape, or the like. In this case, the shape of the entire bonding portion 12*f* and the shape of the adhesive application surface 12*f*1 do not need to match each other. For example, as illustrated in FIG. 28E, the adhesive application surface 12*f*1 may be formed in a square shape, and the entire bonding portion 12*f* may be formed in a rectangular shape.

As described above, by appropriately changing the shape of the bonding portion 12*f*, it is possible to arrange the bonding portion 12*f* in accordance with the shape of the surroundings in which the bonding portion 12*f* is to be placed, and it is possible to improve the degree of freedom in design.

Second Modification of Fourth Embodiment

Next, a second modification of the fourth embodiment will be described. In the second modification of the fourth embodiment, the grooves of the bonding portion 12*f* according to the fourth embodiment are sorted by three depths. Therefore, a configuration thereof similar to that of the fourth embodiment will not be illustrated or will be described with the same reference signs being given in the drawings.

Figure 29A:
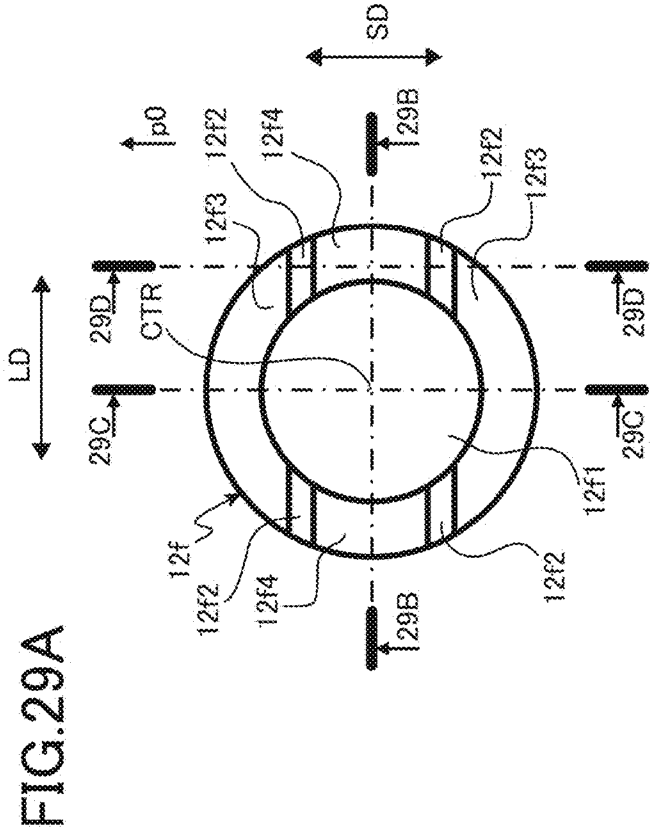
FIG. 29A is a plan view illustrating a bonding portion according to a second modification of the fourth embodiment.
Figure 29B:
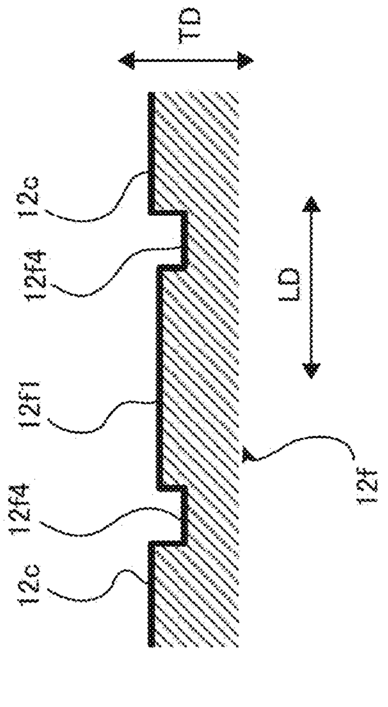
FIG. 29B is a cross-sectional view illustrating a cross section taken along line 29B-29B of FIG. 29A.
Figure 29C:
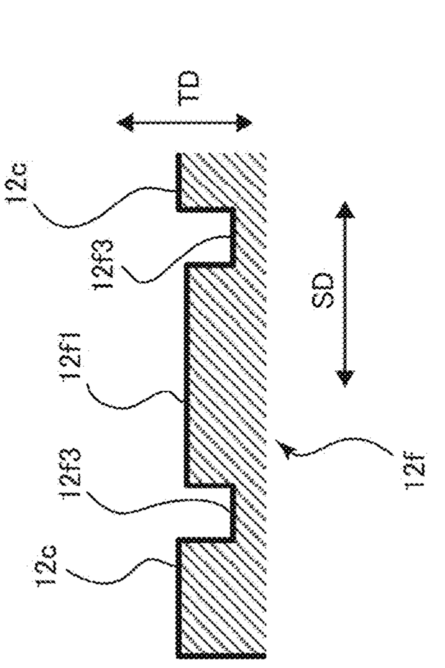
FIG. 29C is a cross-sectional view illustrating a cross section taken along line 29C-29C of FIG. 29A.
Figure 29D:
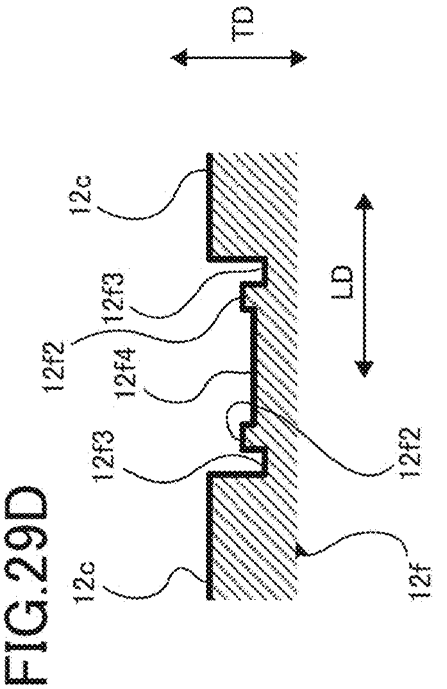
FIG. 29D is a cross-sectional view illustrating a cross section taken along line 29D-29D of FIG. 29A.

FIG. 29A is a plan view illustrating a bonding portion 12*f*. FIG. 29B is a cross-sectional view illustrating a cross section taken along line 29B-29B of FIG. 29A, FIG. 29C is a cross-sectional view illustrating a cross section taken along line 29C-29C of FIG. 29A, and FIG. 29D is a cross-sectional view illustrating a cross section taken along line 29D-29D of FIG. 29A.

As illustrated in FIGS. 29A to 29D, in the present modification, a partial portion of the groove 12*f*2 according to the fourth embodiment is replaced with a groove 12*f*4. The groove 12*f*4 has a depth of 0.8 mm from the second seating surface 12*c*, and is deeper than the groove 12*f*2 and shallower than the groove 12*f*3. That is, using the second seating surface 12*c* as a reference, the depths of the adhesive application surface 12*f*1, the groove 12*f*2, the groove 12*f*4, and the groove 12*f*3 increase in this order.

In the present modification, the grooves of the bonding portion 12*f* are sorted by three depths, but may be sorted by four or more depths.

Third Modification of Fourth Embodiment

Next, a third modification of the fourth embodiment will be described. In the third modification of the fourth embodiment, the shape of the groove **12*f*3 of the bonding portion 12*f*** according to the fourth embodiment is changed. Therefore, a configuration thereof similar to that of the fourth embodiment will not be illustrated or will be described with the same reference signs being given in the drawings.

Figure 30C:
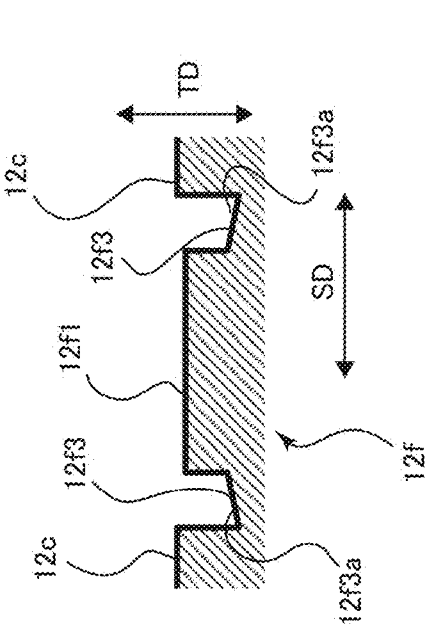
FIG. 30C is a cross-sectional view illustrating a cross section taken along line 30C-30C of FIG. 30A.
Figure 30D:
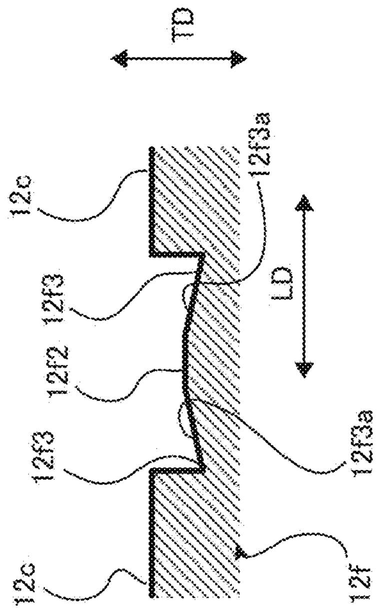
FIG. 30D is a cross-sectional view illustrating a cross section taken along line 30D-30D of FIG. 30A.
Figure 30A:
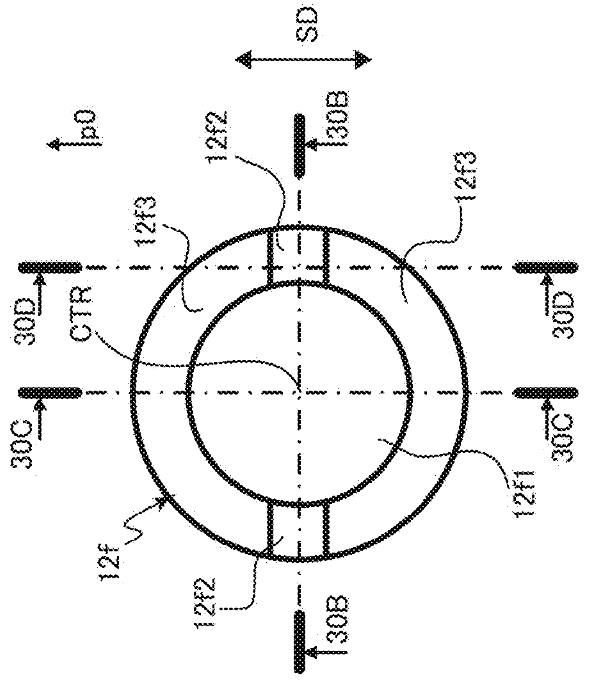
FIG. 30A is a plan view illustrating a bonding portion according to a third modification of the fourth embodiment.
Figure 30B:
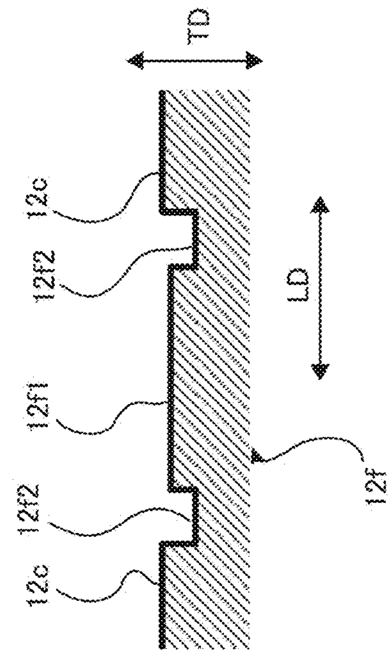
FIG. 30B is a cross-sectional view illustrating a cross section taken along line 30B-30B of FIG. 30A.

FIG. 30A is a plan view illustrating a bonding portion **12*f*. FIG. 30B is a cross-sectional view illustrating a cross section taken along line 30B-30B of FIG. 30A, FIG. 30C is a cross-sectional view illustrating a cross section taken along line 30C-30C of FIG. 30A, and FIG. 30D is a cross-sectional view illustrating a cross section taken along line 30D-30D of FIG. 30**A.

As illustrated in FIGS. 30A to 30D, the groove **12*f*3 according to the third modification of the fourth embodiment has a gradient on a bottom surface 12*f*3*a* thereof, continuously changing the depth of the groove. In the present modification, the bottom surface 12*f*3*a* is inclined downward toward the outside in the short direction SD. In other words, the bottom surface 12*f*3*a* is inclined downward as being farther away from the center CTR of the bonding portion 12*f* in the short direction SD. Also, the groove 12*f*3 has a larger volume than the groove 12*f*2**.

Note that the depth of the groove **12*f*3 may be infinite, that is, the groove 12*f*3 may be a through hole. Further, in the present fourth embodiment, the adhesive application surface 12*f*1 is formed as a smooth flat surface, but the adhesive application surface 12*f*1 may be subjected to embossing or knurling to have irregularities. By forming the irregularities on the adhesive application surface 12*f*1, the surface area of the adhesive application surface 12*f*1 increases, such that the adhesive strength using the heat-resistant adhesive can be improved. In addition, in the present fourth embodiment, the bonding portion 12*f* is provided in the vicinity of the region CP (see FIG. 8) of the second seating surface 12*c* of the heater holder 12, but the bonding portion 12*f* is not limited thereto. The bonding portion 12*f* may be disposed anywhere on the second seating surface 12*c* as long as it is a region where the heat conducting member 18 does not exist in the longitudinal direction LD and a region facing the heater 11** in the thickness direction TD.

Needless to say, in the configuration described in the fourth embodiment (including the first to third modifications thereof) as well, a deviation of the heat conducting member 18 in the longitudinal direction LD can be reduced by providing the protrusions **11*d* and 11*e* described in the first embodiment on the back surface 11*m* of the heater 11**.

Other Embodiments

In any of the embodiments described above, the heater 11 is in direct contact with the fixing film 13, but the heater 11 is not limited thereto. For example, a sheet material having high thermal conductivity such as iron alloy or aluminum may be provided between the heater 11 and the fixing film 13, and the heater 11 may abut on an inner peripheral surface of the fixing film 13 via the sheet material. Even though such a sheet material is provided between the heater 11 and the fixing film 13, the fixing film 13 is interposed between the pressure roller 17 and the heater 11.

In any of the embodiments described above, the heater is not limited to the ceramic heater, and a halogen heater or the like can also be applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-130536, filed Aug. 9, 2023, which is hereby incorporated by reference herein in its entirety.

What is claimed is:

1. A fixing unit comprising:
- a rotary member having a cylindrical shape;
- a pressure member configured to form a fixing nip that fixes a toner image onto a sheet together with the rotary member;
- a heater disposed in an internal space of the rotary member, the heater including a substrate, and a heating element provided on the substrate and configured to heat the rotary member by being energized;
- a heater holder configured to hold the heater; and
- a heat conducting member disposed between the heater and the heater holder,
- wherein the fixing nip conveys the sheet in a direction parallel to a short direction perpendicular to a longitudinal direction of the heater,
- the heater includes a protrusion extending toward the heater holder from a surface, of the heater, provided on a side opposite to the fixing nip,
- the protrusion faces the heat conducting member in the longitudinal direction and is disposed so as not to overlap the heat conducting member as viewed in the short direction,
- the heater holder includes:
  - an abutment surface on which the heater abuts; and
  - a bonding portion provided on the abutment surface to which an adhesive is applied to bond the heater and heater holder,
- the bonding portion includes:
  - an application surface to which the adhesive is applied; and
  - first and second grooves surrounding a periphery of the application surface, and
- the second groove is disposed outside the first groove in the short direction, and has a larger volume than the first groove.

2. The fixing unit according to claim 1, wherein a movement of the heat conducting member in the longitudinal direction is restricted in a case where the heat conducting member abuts against the protrusion.

3. The fixing unit according to claim 1, wherein the protrusion is a first protrusion, and
- the heater further includes a second protrusion extending from the surface toward the heater holder, and
- the second protrusion is disposed on a side opposite to the first protrusion across the heat conducting member in the longitudinal direction while facing the heat conducting member, and is disposed so as not to overlap the heat conducting member as viewed in the short direction.

4. The fixing unit according to claim 3, wherein the first protrusion and the second protrusion do not simultaneously abut on the heat conducting member while the sheet is being conveyed by the fixing nip.

5. The fixing unit according to claim 3, wherein the heat conducting member is configured to be movable between the first protrusion and the second protrusion in the longitudinal direction with respect to the heater.

6. The fixing unit according to claim 3, wherein the heater further includes a third protrusion and a fourth protrusion, the third protrusion and the fourth protrusion extending from the surface toward the heater holder, and the third protrusion and the fourth protrusion are disposed on opposite sides in the short direction across the heat conducting member while facing the heat conducting member, and are disposed so as not to overlap the heat conducting member as viewed in the longitudinal direction.

7. The fixing unit according to claim 1, wherein the heat conducting member is made of a metal material.

8. The fixing unit according to claim 1, wherein the heat conducting member has the same length as the heating element in the longitudinal direction.

9. The fixing unit according to claim 1, wherein the heat conducting member is shorter than the heating element in the longitudinal direction.

10. The fixing unit according to claim 1, wherein the heat conducting member has a higher thermal conductivity than the substrate.

11. The fixing unit according to claim 1, further comprising:

a temperature detection unit provided on the surface of the heater, and configured to detect a temperature of the heater;

a wiring pattern provided on the surface of the heater and electrically connected to the temperature detection unit; and an insulating layer disposed between the surface of the heater and the heat conducting member.

12. The fixing unit according to claim 11, wherein at least a part of the temperature detection unit and the wiring pattern is covered by the insulating layer.

13. The fixing unit according to claim 11, wherein the insulating layer has an opening at a position corresponding to the temperature detection unit.

14. The fixing unit according to claim 13, wherein the heat conducting member has an opening at a position corresponding to the temperature detection unit.

15. The fixing unit according to claim 13, wherein the heat conducting member has a recess recessed in a direction away from the temperature detection unit, the recess being positioned at a position corresponding to the temperature detection unit.

16. The fixing unit according to claim 11, further comprising a conductive wire connected to the wiring pattern, wherein each of the insulating layer and the heat conducting member has an opening through which the conductive wire is wired.

17. The fixing unit according to claim 11, wherein the insulating layer is formed in a sheet shape.

18. The fixing unit according to claim 1, further comprising:

a temperature detection unit provided on the surface of the heater, and configured to detect a temperature of the heater;

a wiring pattern provided on the surface of the heater and electrically connected to the temperature detection unit; and a conductive wire connected to the wiring pattern at a connecting portion, wherein the connecting portion is disposed outside the heat conducting member in the longitudinal direction.

19. The fixing unit according to claim 18, wherein the heater holder has a hole through which the conductive wire passes, and the hole is disposed on the same side as the connecting portion with respect to the heat conducting member in the longitudinal direction.

20. The fixing unit according to claim 18, wherein the heater includes a contact with which the heater is energized, and the connecting portion is disposed on a side opposite to the contact with the heat conducting member interposed therebetween in the longitudinal direction.

21. The fixing unit according to claim 1, wherein the second groove is formed deeper than the first groove with respect to the application surface.

22. The fixing unit according to claim 1, wherein the second groove is closer to an end of the abutment surface than the first groove in the short direction.

23. The fixing unit according to claim 1, wherein the adhesive has elasticity after being cured.

24. The fixing unit according to claim 1, wherein the rotary member is a film, the heater nips the film together with the pressure member, and the toner image formed on the sheet is fixed onto the sheet by being heated through the film at the fixing nip.

25. An image forming apparatus comprising:

an image forming unit that forms a toner image on a sheet; and the fixing unit according to claim 1 configured to fix the toner image formed, on the sheet, by the image forming unit onto the sheet.

* * * * *